(12) United States Patent
Roberts et al.

(10) Patent No.: US 9,067,727 B2
(45) Date of Patent: Jun. 30, 2015

(54) APPARATUS AND METHOD FOR REMOVING MATERIALS FROM A MATERIAL COLLECTION CONTAINER

(75) Inventors: R. Lee Roberts, Rose Valley, PA (US); Mark Robert Battaglia, Wallingford, PA (US); Mark Kevin Addison, Bear, DE (US); David Stuart Paskman, Gloucester, NJ (US); Andrew Scott Taylor, Warminster, PA (US)

(73) Assignee: Roberts Marketing DE, Inc., Wilimington, DE (US)

( * ) Notice: Subject to any disclaimer, the term of this patent is extended or adjusted under 35 U.S.C. 154(b) by 638 days.

(21) Appl. No.: 13/373,303

(22) Filed: Nov. 10, 2011

(65) Prior Publication Data

US 2013/0118616 A1    May 16, 2013

(51) Int. Cl.

| *B01D 21/18* | (2006.01) |
|---|---|
| *B65D 88/54* | (2006.01) |
| *B01D 21/00* | (2006.01) |
| *B01D 21/20* | (2006.01) |
| *B01D 21/24* | (2006.01) |
| *C02F 1/00* | (2006.01) |

(52) U.S. Cl.
CPC ......... *B65D 88/548* (2013.01); *Y10T 137/8593* (2015.04); *B01D 21/18* (2013.01); *B01D 21/0003* (2013.01); *B01D 21/0024* (2013.01); *B01D 21/20* (2013.01); *B01D 21/245* (2013.01); *C02F 2001/007* (2013.01)

(58) Field of Classification Search
CPC .... B01D 21/0003; B01D 21/18; B01D 21/20; B01D 21/24; B01D 21/245; C02F 2001/007

USPC ............... 210/800, 803, 513, 523, 527, 532.1
See application file for complete search history.

(56) References Cited

U.S. PATENT DOCUMENTS

| 3,669,271 | A |   | 6/1972 | McGivern |
|---|---|---|---|---|
| 3,797,664 | A |   | 3/1974 | Pentz et al. |
| 3,935,104 | A |   | 1/1976 | Russell et al. |
| 4,276,165 | A |   | 6/1981 | Chamberlain |
| 4,401,576 | A | * | 8/1983 | Meurer ........................ 210/803 |
| 5,047,150 | A | * | 9/1991 | Mitchell ....................... 210/527 |
| 5,620,601 | A | * | 4/1997 | Wilcher et al. ............... 210/525 |
| 5,655,727 | A |   | 8/1997 | Hanson et al. |
| 5,720,890 | A |   | 2/1998 | Caliva |
| 5,885,458 | A | * | 3/1999 | Wilcher et al. ............... 210/525 |
| 6,073,779 | A | * | 6/2000 | Shea et al. ................... 210/527 |
| 6,234,323 | B1 | * | 5/2001 | Sarrouh ........................ 210/523 |
| 6,497,249 | B1 |   | 12/2002 | Swan et al. |
| 6,951,620 | B2 |   | 10/2005 | Brauch et al. |

(Continued)

Primary Examiner — Christopher Upton
(74) Attorney, Agent, or Firm — Merek, Blackmon & Voorhees, LLC

(57) ABSTRACT

An apparatus for removing material collected in a material collection container having a floor and at least one substantially vertically extending wall. The apparatus includes a material removal assembly for removing material collected in the material collection container. The material removal assembly includes a first conduit and a second conduit. The first conduit is in telescoping relationship with the second conduit to permit the first conduit to move relative to the second conduit. The first conduit and the second conduit each have a longitudinal axis. The material removal assembly further includes at least one material removal header configured to receive material accumulating on the floor of the material collection container. The material removal assembly is preferably configured to enhance numerous aspects of the sludge removal process.

32 Claims, 21 Drawing Sheets

(56) References Cited

U.S. PATENT DOCUMENTS

| | | |
|---|---|---|
| 7,021,472 B1 | 4/2006 | Meurer |
| 7,105,096 B2 | 9/2006 | Meurer |
| 7,159,724 B2 | 1/2007 | Brauch et al. |
| 7,169,312 B1 | 1/2007 | Meurer |
| 7,780,015 B1 | 8/2010 | Brauch et al. |
| 7,981,302 B2 | 7/2011 | Brauch et al. |
| 8,074,810 B2 | 12/2011 | Brauch et al. |
| 2001/0052493 A1 | 12/2001 | Bryan et al. |
| 2013/0118618 A1* | 5/2013 | Roberts .................. 137/605 |

* cited by examiner

APPARATUS AND METHOD FOR REMOVING MATERIALS FROM A MATERIAL COLLECTION CONTAINER

FIELD OF THE INVENTION

The present invention is directed to an apparatus and method for removing material from a material collection container. The material may be any form of impurity including a fluid, a solid or a combination thereof. In the most preferred form, the present invention is directed to an apparatus and method for removing sludge from a sludge collection container. The sludge collection container may include one or more members designed to settle sludge from water or wastewater including but not limited to settling plates or settling tubes. The present invention may be used in containers having other structures that would intentionally or inadvertently cause impurities to collect in the containers and where it is beneficial to remove the collected impurities from the containers.

BACKGROUND OF THE INVENTION

Filter or clarification systems have employed various devices to remove impurities from water and/or wastewater for a number of years. In these types of filter systems, settling systems are often used to remove impurities from a liquid. Plates or tubes are commonly used to drastically reduce the footprint of prior clarification systems that merely included an open basin. The plates or tubes are commonly mounted at fixed angles to the surface of the liquid to form a plurality of liquid flow channels. The fixed angle of the plates or tubes creates overlapping, horizontally projected surfaces that increase the effective settling surface area compared to an open basin. The increased effective settling surface area is desirable as filtering or clarification capacity is proportional to surface area.

The liquid to be filtered is directed through the plurality of liquid flow channels to cause the impurities to settle downwardly at the lower portion of a detention basin or sludge collection area. The liquid to be filtered can travel upwardly or downwardly through the plurality of liquid flow channels during the filtration or clarification process. As the liquid flows upwardly or downwardly through the inclined liquid flow passageways, the impurities settle out of the liquid being filtered and accumulate in the lower portion of the detention basin or collection area. It is desirable to periodically remove the impurities from the collection container.

Previously, flexible hoses have been used to remove impurities from one or more header pipes designed to collect impurities accumulating in a detention basin or collection container. Sludge removal systems employing flexible hoses have a number of disadvantages. Several of these disadvantages are explained in U.S. Pat. No. 6,951,620. Therefore, some sludge removal systems have been designed without flexible hoses. These systems are often referred to as hoseless sludge removal/collection systems. U.S. Pat. Nos. 6,497,249; 6,951,620; 7,021,472; and 7,169,312 disclose sludge removal systems of the hoseless type. However, these systems have inherent disadvantages due to their designs. For example, U.S. Pat. No. 6,497,249 discloses an overly complex system. In one embodiment, two travelling trolleys 5 and 5a are required. In an alternative embodiment illustrated in FIGS. 3 to 5, an overly complex drive system and traveling trolley configuration are employed in an attempt to remove sludge accumulating in a material collection container.

U.S. Pat. Nos. 6,951,620; 7,021,472; and 7,169,312 disclose a sludge removal system that employs two telescoping conduits disposed directly adjacent the bottom of a detention basin or collection container. The larger of the two telescoping conduits moves between two opposing end walls of the basin. The movement of the larger conduit is impeded by the sludge accumulated in the lower portion of the detention basin or collection container, due to the position of the telescoping conduits relative to the removal headers and the sludge accumulating in the detention basin or collection area. Further, there is no means by which sludge can be collected in one of the two header pipes independent of the other header pipe. Moreover, the proximity of the two header pipes to the floor of the detention basin or collection container is limited by the size of the diameter of the larger conduit as the longitudinal axis of the two header pipes intersects the longitudinal axis of the larger conduit of the two telescoping conduits. In addition, the header pipes are fixed to one of the two telescoping pipes in such a manner as to prevent the header pipes from moving in a vertical direction relative to the two telescoping pipes preventing the vertical orientation of the header pipes to be readily adjusted during operation to compensate for floor surfaces that are not level.

Hence, there is a need for a material removal system that overcomes the aforementioned disadvantages as well as other disadvantages not articulated above.

OBJECTS AND SUMMARY OF THE INVENTION

An object of the present invention is to provide a novel and unobvious apparatus and method for removing material from a detention basin or collection area.

Another object of a preferred embodiment of the present invention is to provide a material removal system that is free of flexible hoses.

A further object of a preferred embodiment of the present invention is to provide a material removal system that is designed to permit one or more collection headers to be positioned in close proximity of the floor of a detention basin or collection area.

Still a further object of a preferred embodiment of the present invention is to provide a material removal system that employs a plurality of collection headers and is configured to allow sludge to be removed from at least one collection header independent from at least one other collection header.

Yet another object of a preferred embodiment of the present invention is to provide a material removal system that includes at least first and second telescoping conduits with the first conduit being movable relative to the second conduit and the first conduit being disposed such that sludge collection in the lower portion of the collection basin does not retard movement of the first conduit but allows the at least one header operably connected to the first conduit to be disposed in close proximity to the floor of the collection basin.

Still a further object of a preferred embodiment of the present invention is to provide a cost effective material removal system that is relatively easy to install and operate to effectively and efficiently remove material from a material collection container.

Yet still another object of a preferred embodiment of the present invention is to provide a material removal system having a support assembly that permits movement of one or more collection components of the material removal system to permit efficient and effective removal of material collected in all portions of the material collection container.

Yet a further object of a preferred embodiment of the present invention is to provide a material removal system having at least one header and at least one conduit and means for facilitating movement of material from the at least one header to the at least one conduit.

Another object of a preferred embodiment of the present invention is to provide a material removal system that includes at least first and second telescoping conduits with the first conduit being movable relative to the second conduit and a sludge collection header operably associated with the first and second conduits to permit said sludge collection header to mover relative to both the first and second conduits to accommodates for irregularities in the collection container or detention basin.

A further object of a preferred embodiment of the present invention is to provide a material removal system that includes at least first and second telescoping conduits and a fluid drive system for moving the first conduit relative to the second conduit to effectively and efficiently remove sludge in a collection container or detention basin.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to an apparatus for removing material collected in a material collection container having a floor and at least one substantially vertically extending wall The apparatus includes a material removal assembly for removing material collected in the material collection container. The material removal assembly includes a first conduit and a second conduit. The first conduit is in telescoping relationship with the second conduit to permit the first conduit to move relative to the second conduit. The first conduit and the second conduit each have a longitudinal axis. The material removal assembly further includes a first material removal header configured to receive material accumulating on the floor of the material collection container and a second material removal header configured to receive material accumulating on the floor of the material collection container. The first material removal header is spaced from the second material removal header along the longitudinal axis of the first conduit. The first material removal header and the second material removal header are configured to direct material received by the first removal header and the second removal header into the first conduit. The first material removal header and the second material removal header each have a longitudinal axis. The longitudinal axis of at least one of the first material removal header and the second material removal header is disposed below the longitudinal axis of the first conduit.

Another preferred embodiment of the present invention is directed to an apparatus for removing sludge collected in a sludge collection container having a floor and at least one substantially vertically extending wall. The apparatus includes a sludge removal assembly for removing sludge collected in the sludge collection container. The sludge removal assembly includes a first conduit and a second conduit. The first conduit is in telescoping relationship with the second conduit to permit the first conduit to move relative to the second conduit. The sludge removal assembly further includes a first sludge removal header configured to receive sludge accumulating on the floor of the sludge collection container and a second sludge removal header configured to receive sludge accumulating on the floor of the sludge collection container. The first sludge removal header is spaced from the second sludge removal header along a longitudinal axis of the first conduit. The first sludge removal header and the second sludge removal header is configured to direct sludge received by the first sludge removal header and the second sludge removal header into the first conduit. The sludge removal assembly is configured such that the first sludge removal header and the second sludge removal header are at least partially disposed in sludge collected in the sludge collection container and the first conduct is disposed above the sludge collected in the sludge collection container so that movement of the first conduct relative to the second conduit is not retarded by sludge in the sludge collection container prior to entry of the sludge into the sludge removal assembly.

A further preferred embodiment of the present invention is directed to an apparatus for removing material collected in a material collection container having a floor and at least one substantially vertically extending wall. The apparatus includes a material removal assembly for removing material collected in the material collection container. The material removal assembly includes a first conduit and a second conduit. The first conduit is in telescoping relationship with the second conduit to permit the first conduit to move relative to the second conduit. The material removal assembly further includes a first material removal header configured to receive material accumulating on the floor of the material collection container and a second material removal header configured to receive material accumulating on the floor of the material collection container. The first material removal header is spaced from the second material removal header along a longitudinal axis of the first conduit. The first material removal header and the second material removal header are configured to direct material received by the first material removal header and the second material removal header into the first conduit. The material removal assembly further includes a material flow control member for preventing material received by at least one of the first material removal header and the second material removal header from passing into the first conduit.

Still another preferred embodiment of the present invention is directed to an apparatus for removing material collected in a material collection container having a floor and at least one substantially vertically extending wall. The apparatus includes a material removal assembly for removing material collected in the material collection container. The material removal assembly includes a first conduit and a second conduit. The first conduit is in telescoping relationship with the second conduit to permit the first conduit to move relative to the second conduit. The material removal assembly further includes a first material removal header configured to receive material accumulating on the floor of the material collection container. The first material removal header is configured to direct material received by the first material removal header into the first conduit. The first material removal header is configured to move with the first conduit. The first material removal header includes means for facilitating movement of material received by the first material removal header into the first conduit.

Still a further preferred embodiment of the present invention is directed to an apparatus for removing material collected in a material collection container having a floor and first and second end walls. The apparatus includes a material removal assembly for removing material collected in the material collection container. The material removal assembly includes a first conduit and a second conduit. The first conduit is in telescoping relationship with the second conduit to permit the first conduit to move relative to the second conduit.

The material removal assembly further includes a first material removal header configured to receive material accumulating on the floor of the material collection container. The first material removal header is configured to direct material received by the first material removal header into the first conduit. The first material removal header is configured to move with the first conduit. The material removal assembly further includes a support member configured to extend between the first and second end walls of the material collection container. The support member has a first end and a second end. The first material removal header is configured to ride along the support member when the first material removal header travels between the first and second end walls of the material collection container. The support member is spaced from the first conduit and the second conduit.

Yet another preferred embodiment of the present invention is directed to an apparatus for removing material collected in a material collection container having a floor and at least one substantially vertically extending wall. The apparatus includes a material removal assembly for removing material collected in the material collection container. The material removal assembly includes a first conduit and a second conduit. The first conduit is in telescoping relationship with the second conduit to permit the first conduit to move relative to the second conduit. The material removal assembly further includes a first material removal header configured to receive material accumulating on the floor of the material collection container. The first material removal header is configured to direct material received by the first material removal header into the first conduit. The material removal assembly further includes means for positioning the first material removal header above the floor of the material collection header and in close proximity of the floor of the material collection header.

Still another preferred embodiment of the present invention is directed to an apparatus for removing material collected in a material collection container having a floor and at least one substantially vertically extending wall. The apparatus includes a material removal assembly for removing material collected in the material collection container. The material removal assembly includes a first conduit and a second conduit. The first conduit is in telescoping relationship with the second conduit to permit the first conduit to move relative to the second conduit. The material removal assembly further includes a first material removal header configured to receive material accumulating on the floor of the material collection container. The first material removal header is configured to direct material received by the first material removal header into the first conduit. The first material removal header is operably connected to the first conduit to cause the first material removal header to move with the first conduit in a first direction and allow the first material removal header to move relative to the first conduit in a second direction.

Still yet another preferred embodiment of the present invention is directed to an apparatus for removing material collected in a material collection container having a floor and at least one substantially vertically extending wall. The apparatus includes a material removal assembly for removing material collected in the material collection container. The material removal assembly includes a first conduit and a second conduit. The first conduit is in telescoping relationship with the second conduit to permit the first conduit to move relative to the second conduit. The material removal assembly further includes a first material removal header configured to receive material accumulating on the floor of the material collection container and a second material removal header configured to receive material accumulating on the floor of the material collection container. The first material removal header is spaced from the second material removal header along the longitudinal axis of the first conduit. The first material removal header and the second material removal header is configured to direct material received by the first removal header and the second removal header into the first conduit. The material removal assembly further includes a fluid drive for moving the first conduit relative to the second conduit.

DETAILED DESCRIPTION OF THE PREFERRED EMBODIMENTS OF THE INVENTION

The preferred forms of the invention will now be described with reference to FIGS. 1-22. The appended claims are not limited to the preferred forms and no term and/or phrase used herein is to be given a meaning other than its ordinary meaning unless it is expressly stated otherwise.

FIGS. 1 Through 7

Figure 1:
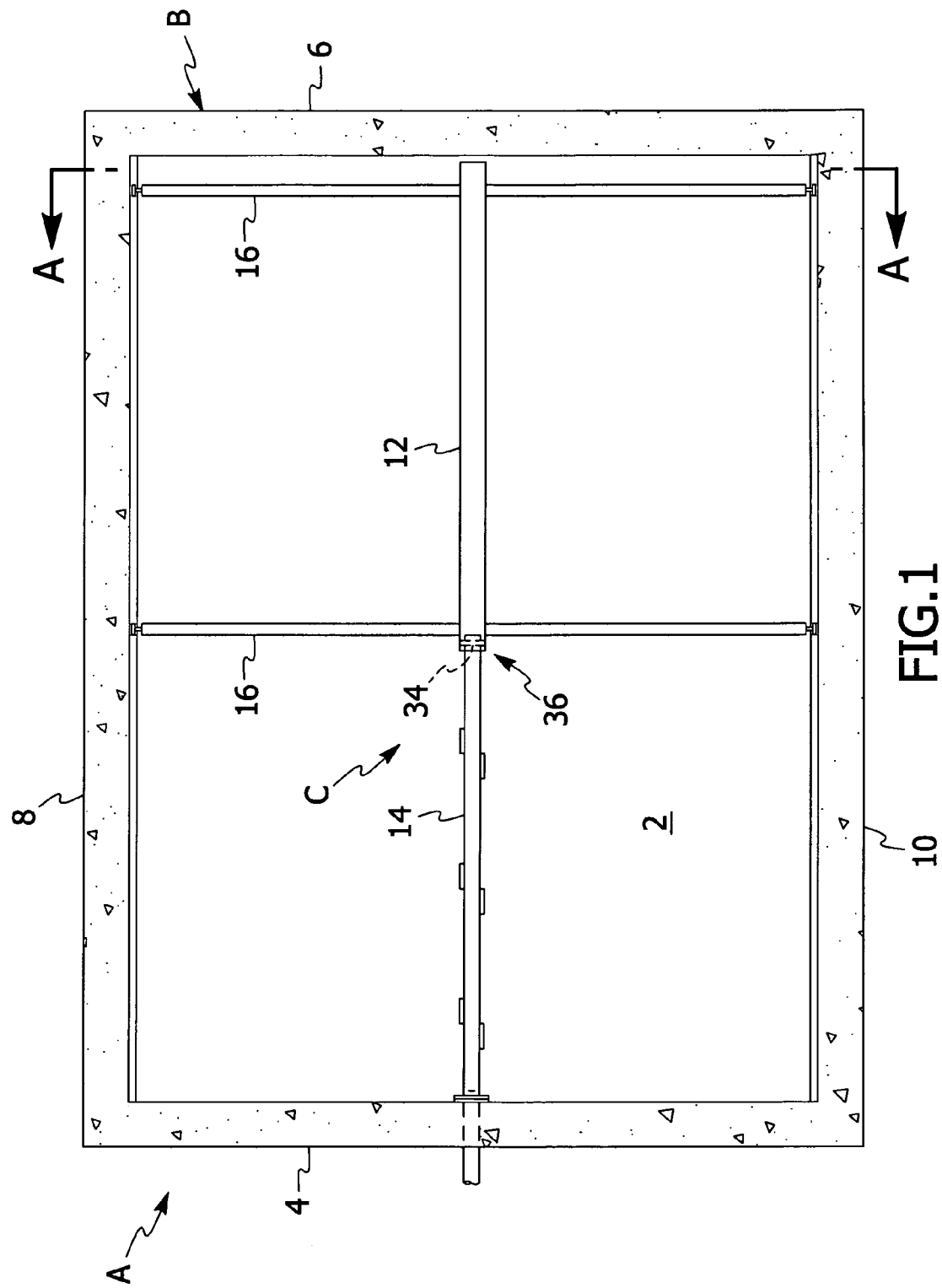
FIG. 1 is a plan view of a preferred form of the present invention.
Figure 2:
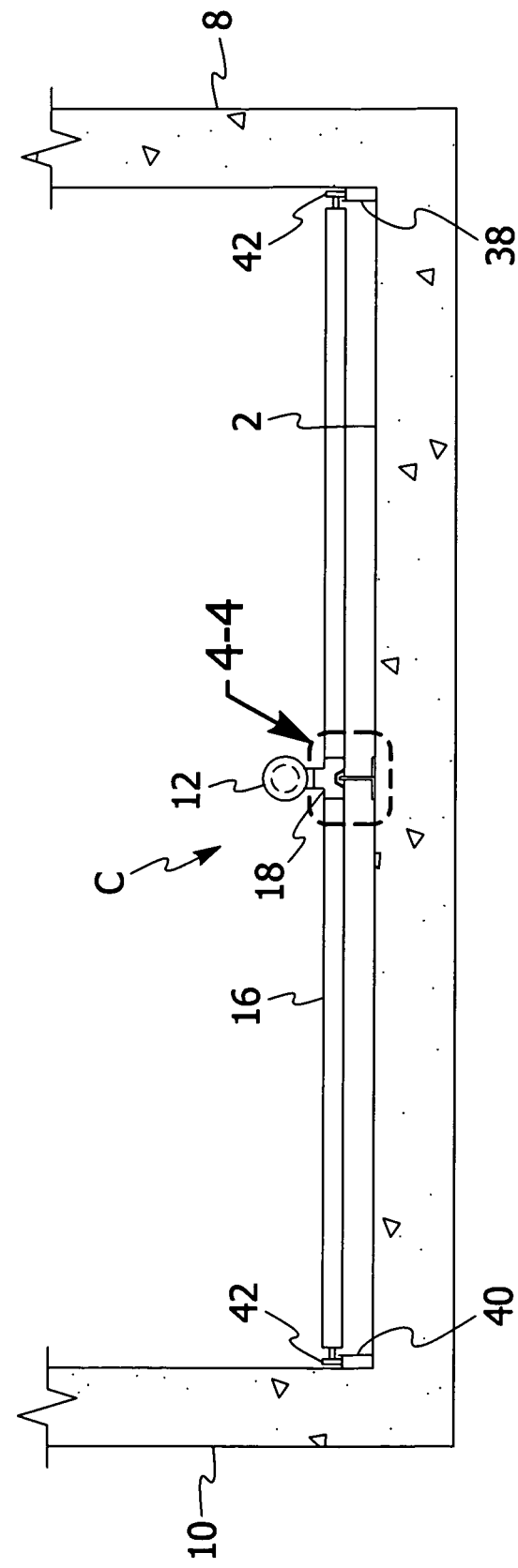
FIG. 2 is a cross-sectional view of the embodiment illustrated in FIG. 1.
Figure 3:
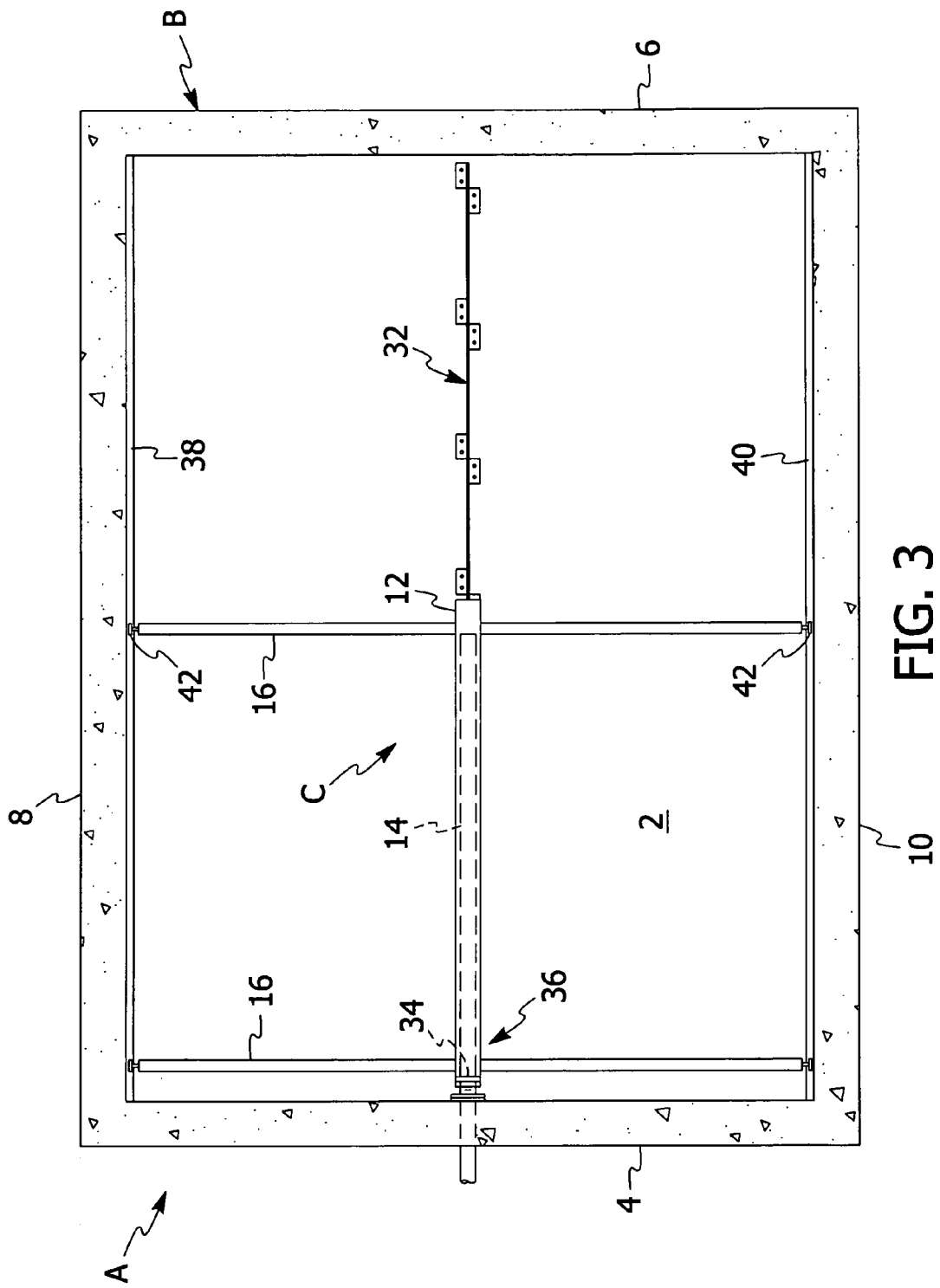
FIG. 3 is a plan view of the embodiment illustrated in FIG. 1 showing the sludge removal assembly in the fully retracted position.

Referring to FIGS. 1 to 3, a settling system A employing a preferred form of the invention is illustrated in one of many possible configurations. In the most preferred form, the material being removed from the settling system A is sludge. Settling system A includes a material container B. The material container may include one or more settling assemblies (not shown) having a plurality of inclined passageways in which an influent to be filtered or clarified is passed. The plurality of inclined passageways may be formed for example by a plurality of plates or tubes. As the influent passes through the inclined passageways of the one or more settling assemblies impurities in the influent settle and collect on the floor 2 of the material collection container B. Material removal system C periodically removes the impurities from material container B. It should be noted that the present invention is not limited to use in settling systems but rather can be used in any system in which it is desirable to remove material collecting in a container or basin. In FIGS. 1 to 3, the material collection container B is shown as being formed from concrete and having a rectangular configuration with end walls 4 and 6 and side walls 8 and 10. However, it will be readily appreciated that material collection container B may be formed from any suitable material and may take any desired configuration.

As shown in FIGS. 1 to 3, material removal system C includes first and second conduits 12 and 14. Preferably, conduits 12 and 14 are substantially cylindrical and formed from a rigid or semi-rigid material (e.g., PVC, stainless steel or other suitable material). Conduits 12 and 14 have a telescoping relationship such that conduit 12 is movable between a fully extended position show in FIG. 1 and a fully retracted position shown in FIG. 3 while conduit 14 is fixed relative to material collection container B. Any suitable drive system may be used for extending and retracting conduit 12 including but not limited to the cable drive system disclosed in U.S. Pat. No. 6,951,620. The drive system can be mechanical, pneumatic, hydraulic or any combination thereof.

Figure 4:
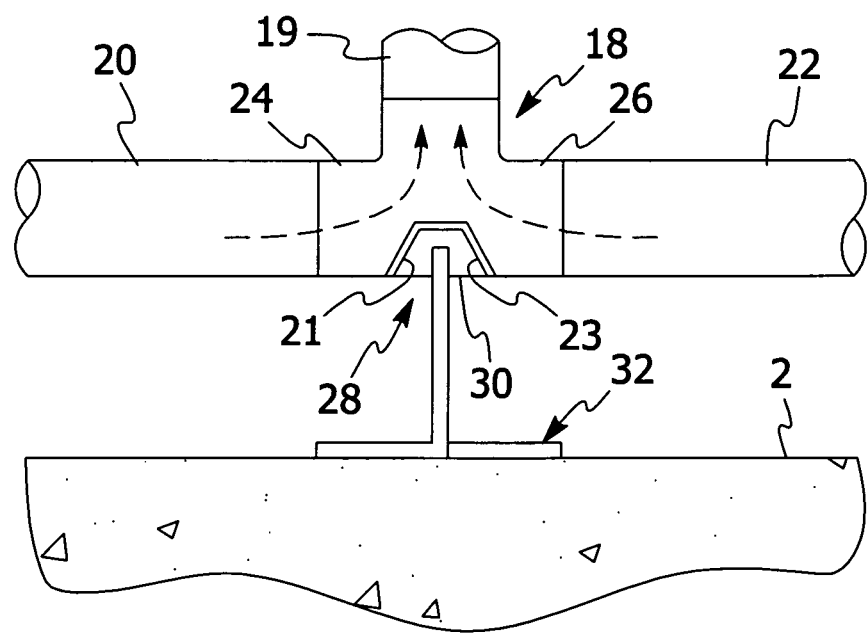
FIG. 4 is fragmentary cross-sectional view of portion 4-4 indicated in dashed lines in FIG. 2.

Two material collection headers 16 are preferably connected to conduit 12. However, only one or more than two collection headers may be connected to conduit 12. Each of the material collection headers 16 include at least one opening for receiving material collected in container B. Referring to FIGS. 2 and 4, collection headers 16 are connected to conduit 12 so that headers 16 move with conduit 12. The manner of connecting each of the collection headers 16 to the underside of conduit 12 is preferably the same. Specifically, a T-shaped coupler 18 is connected to a hollow collar 19 extending downwardly from the underside of conduit 12. Preferably, the connection of conduit 12 to collar 19 and the connection of collar 19 to T-shaped coupler 18 is fluid tight and may be achieved in any known manner. Collection conduits 20 and 22 are connected preferably in a fluid tight manner to ends 24 and 26 of T-shaped coupler 18. Collection conduits 20 and 22 preferably have a plurality of openings (not shown) uniformly spaced along the length of the respective conduit and disposed directly adjacent floor 2 of container B to receive material collected in container B. It should be noted that collar 19 may be omitted by directly connecting T-shaped coupler 18 to the underside of conduit 12.

Referring to FIG. 4, T-shaped coupler 18 has a notch or recess 28 that extends the entire length of the underside of T-shaped coupler 18. The notch or recess preferably forms two interior, inclined, planar surfaces 21 and 23 as means for facilitating movement of material collected by conduits 20 and 22 upwardly into conduit 12. A friction reduction member 30 is disposed in notch or recess 28 and includes a slot or other opening for receiving an upper portion of center support rail 32. The friction reduction member 30 is formed from a polymeric material and is fixed to T-shaped coupler 18 so that the friction reduction member 30 cannot move relative to T-shaped coupler 18 or conduit 12. As the conduit 12 moves between the positions illustrated in FIGS. 1 and 3, the friction reduction member 30 facilitates that movement by reducing the friction between center rail 32 and both T-shaped couplers 18 associated with each of the collection headers 16.

Preferably, center rail 32 is bolted or otherwise secured to the floor 2 of container B. However, it will be readily appreciated that center rail 32 may be fixed in place by securing it to other portions of container B.

Referring to FIGS. 1 and 3, a seal 34 is positioned in end 36 of conduit 12. Seal 34 surrounds conduit 14 and is movable along conduit 14 as conduit 12 travels between the positions illustrated in FIGS. 1 and 3. Side rails 38 and 40 may be used in place of or in addition to center rail 32. Side rails 38 and 40 preferably extend substantially the entire length of side walls 8 and 10 respectively. Rollers 42 or other members (e.g., runners or skids) may be attached to each of the ends of headers 16 to engage the corresponding side rail to facilitate movement of conduit 12 and headers 16 between the positions illustrated in FIGS. 1 and 3. Rollers 42 may be formed from any suitable material including but not limited to a polymeric material.

The preferred material removal process will now be described. A vacuum pump or other means for creating a negative pressure differential is connected to the end of conduit 14 located outside of the container B when the material removal system C is in the position illustrated in FIG. 3. This will cause sludge or other material collected on the floor 2 of container B to flow into the headers 16. The sludge then flows into conduit 12 and subsequently into conduit 14 and out of container B. Conduit 12 may then be moved from the position shown in FIG. 3 by a chain drive or other means to the position shown in FIG. 1. Material may be collected the entire time the drive system is operating. In this manner, material can be uniformly collected from the floor 2 of container B. Alternatively, the conduit 12 may be moved a predetermined distance by the drive system while the vacuum pump is off. Once the conduit 12 has traveled the predetermined distance, the vacuum pump can be turned on to resume the material collection and removal process. This procedure can be repeated as many times as desired until conduit 12 assumes the position illustrated in FIG. 3. Either of the above two collection procedures can be performed when the conduit 12 is moving from the position shown in FIG. 1 to the position shown in FIG. 3. In addition, the sludge collection and removal process may commence with the conduit in any position between the positions illustrated in FIGS. 1 and 3.

The configuration in FIGS. 1 through 4 allows headers 16 to be partially or completed submerged in the material collected on the floor 2 of container B while conduit 12 remains above the uppermost portion of the material collected in container B so that the material collected in container B does not act to retard or otherwise hamper movement of conduit 12 between end walls 4 and 6. It should be noted that collar 19 can be configured to be readily removed and replaced with a collar having a different height to readily vary the position of headers 16 relative to conduits 12 and 14. By attaching center rail 32 to headers 16 in the corresponding notches 28, the headers are able to be positioned in close proximity to the floor 2 of container B.

Figure 5:
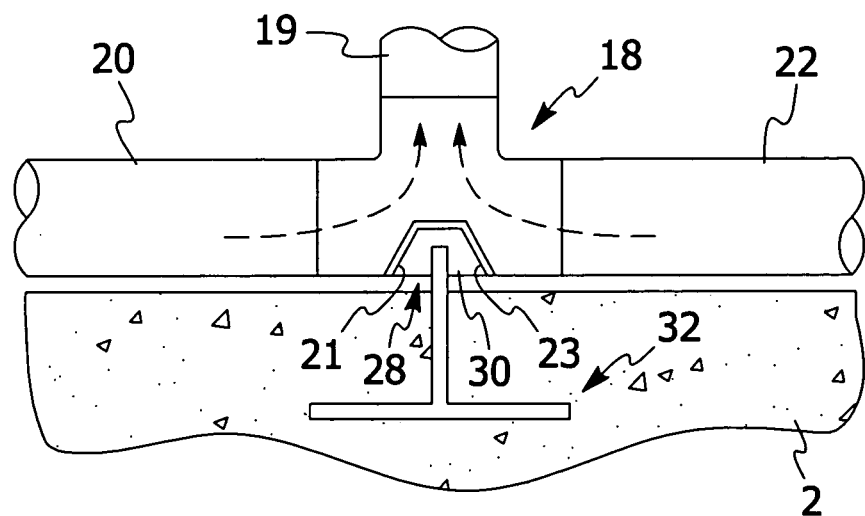
FIG. 5 is a fragmentary cross-sectional view of an alternative form for the portion illustrated in FIG. 4.
Figure 6:
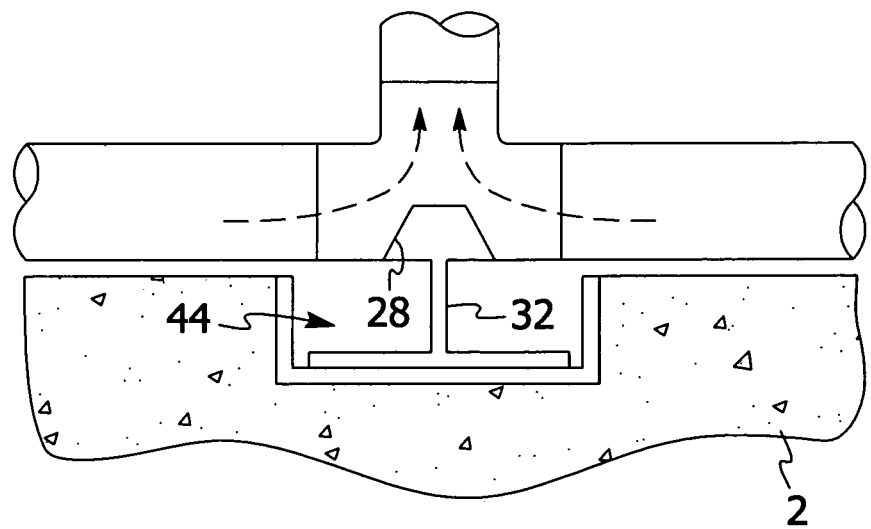
FIG. 6 is a fragmentary cross-sectional view of a further alternative form for the portion illustrated in FIG. 4.

FIGS. 5 and 6 illustrate additional means for positioning headers 16 in close proximity to floor 2. As seen in FIG. 5, center rail 32 can be embedded in floor 2 of container B. Alternatively, as shown in FIG. 6, rail 32 may be positioned in a recessed portion 44 formed in floor 2 of container B. Recessed portion 44 may extend substantially the length of floor 2 between end walls 4 and 6 or any portion thereof.

Figure 7:
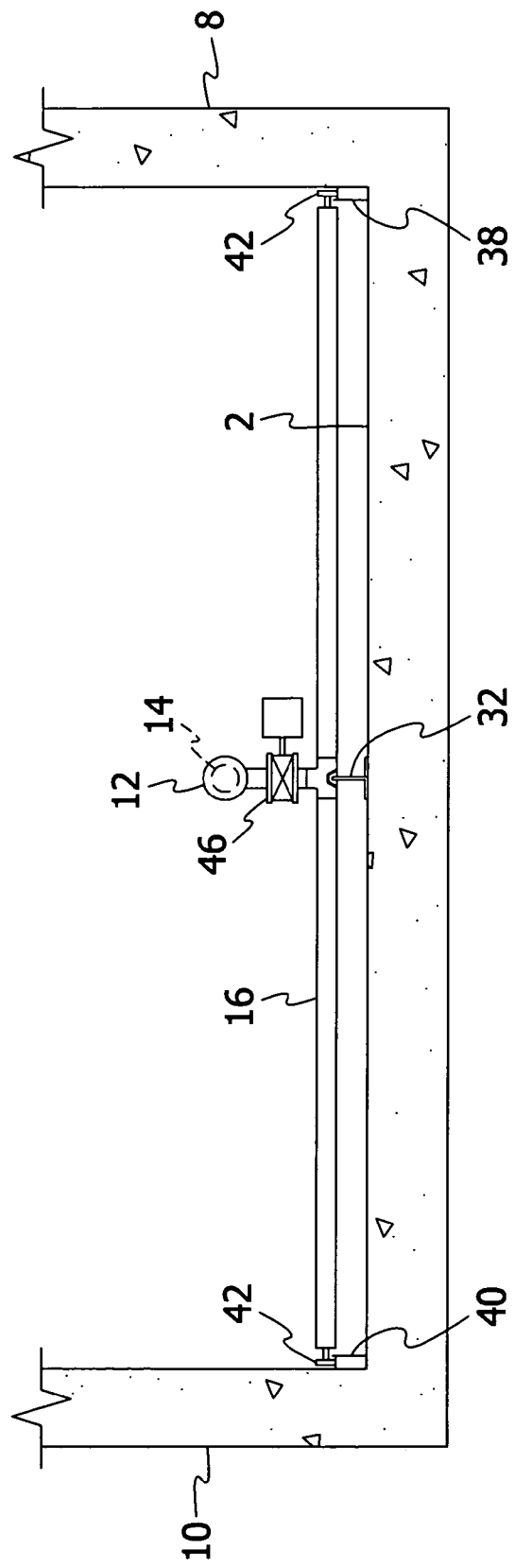
FIG. 7 is fragmentary cross-sectional view of another preferred form of the present invention.

Referring to FIG. 7, an isolation valve 46 may be provided between each header 16 and conduit 12 to control the flow of material from each header 16 to conduit 12. By merely manipulating the two isolation valves 46 material may flow from either one of headers 16 to conduit 12 while material is prevented from flowing from the other header to conduit 12. Alternatively, material may flow simultaneously from both headers to conduit 12. Isolation valve 46 can be a wafer style butterfly valve, a fully ported ball valve, a diaphragm valve or needle valve. The two isolation valves 46 may be activated in any acceptable manner including pneumatic and hydro-pneumatic activation.

FIGS. 8 to 22

Referring to FIGS. 8 to 18, another preferred form of the invention will now be described. It should be noted that a number of similarities exist between this embodiment and previously described embodiments. Use of the same reference numerals and letters will signify common components of the embodiments.

Figure 8:
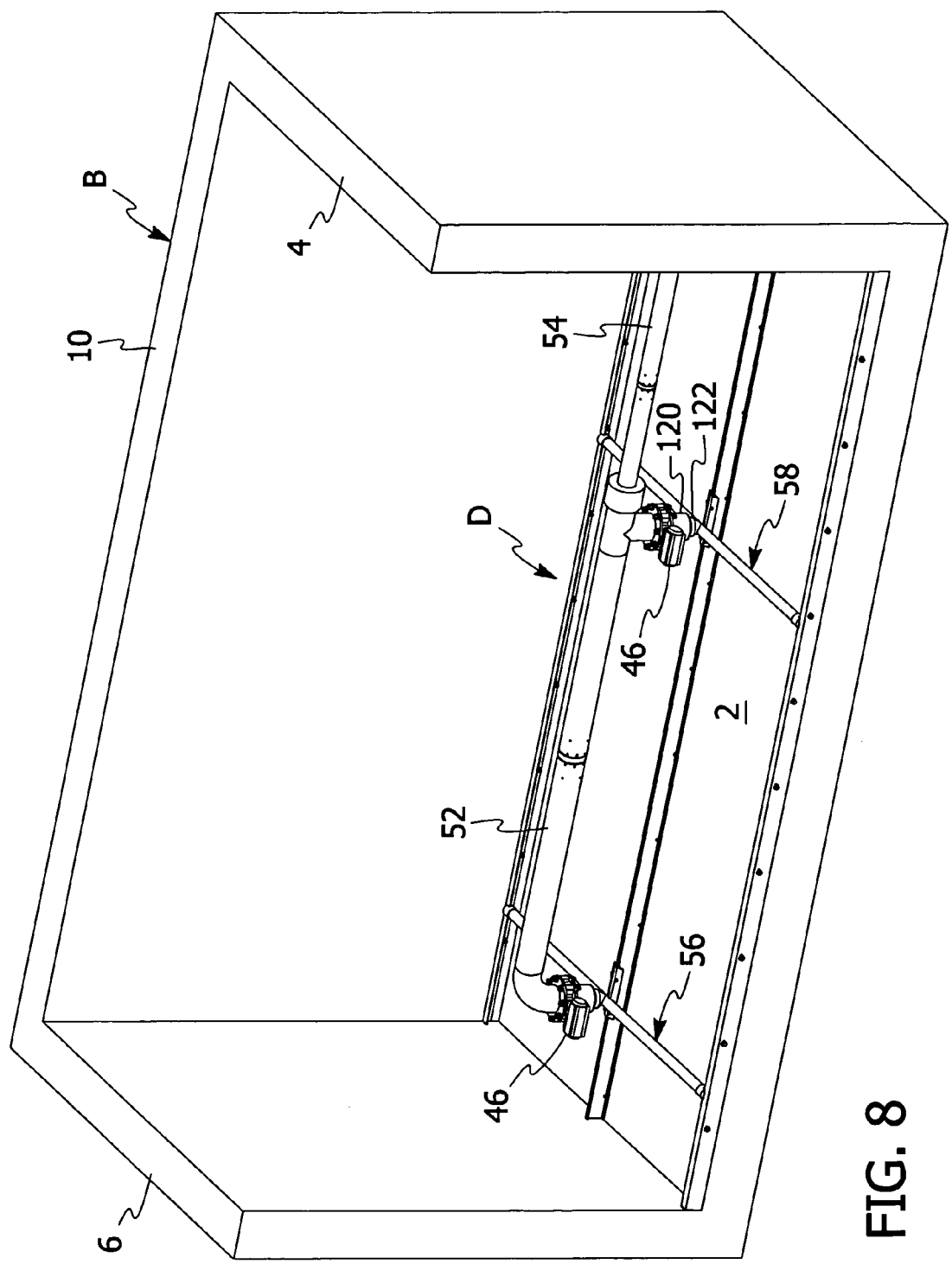
FIG. 8 is a fragmentary perspective view of a further preferred form of the present invention with one sidewall of the material collection container removed to permit other components to be readily observed.

Material removal system D periodically removes the impurities from material container B. Referring to FIG. 8, material removal system D includes first and second conduits 52 and 54. Preferably, conduits 52 and 54 are substantially cylindrical and formed from a rigid or semi-rigid material (e.g., PVC, stainless steel or other suitable material). Conduits 52 and 54 have a telescoping relationship such that conduit 52 is movable between a fully extended position where material collection header 56 is positioned adjacent end wall 6 and a fully retracted position where material collection header 58 is positioned adjacent end wall 4. It should be noted that although not shown in FIG. 8, conduit 54 extends out of container B much like conduit 14 in the previously described embodiments. The position of conduit 54 is fixed relative to container B. Any suitable drive system may be used for extending and retracting conduit 52 including but not limited to the cable drive system disclosed in U.S. Pat. No. 6,951,620. The drive system can be mechanical, pneumatic, hydraulic or any combination thereof. However, in the most preferred form of the present invention a fluid drive is used move conduit 52 between the fully extended and fully retracted positions.

Figure 16:
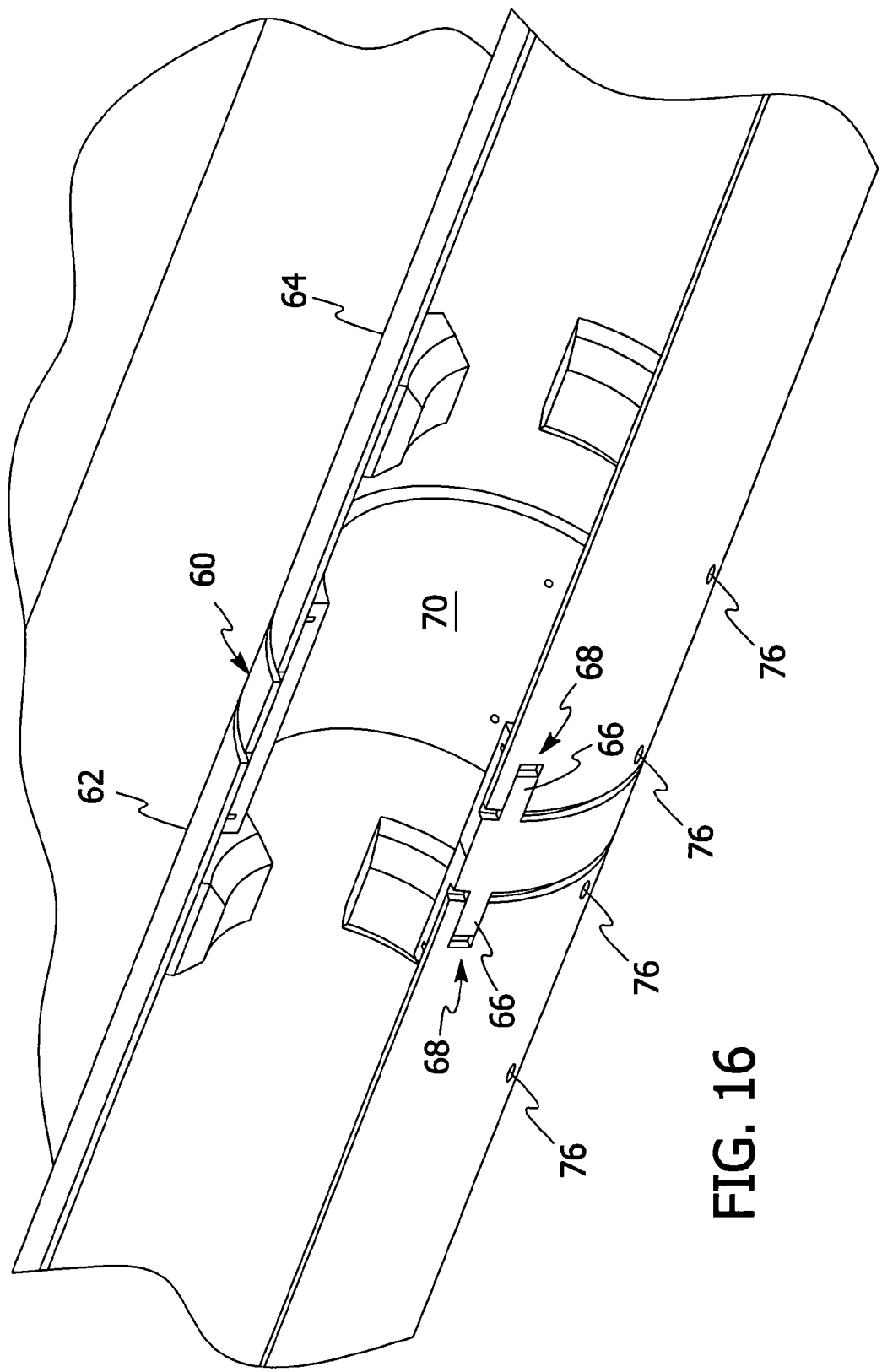
FIG. 16 is an enlarged fragmentary perspective view of a portion of the embodiment illustrated in FIG. 8.
Figure 17:
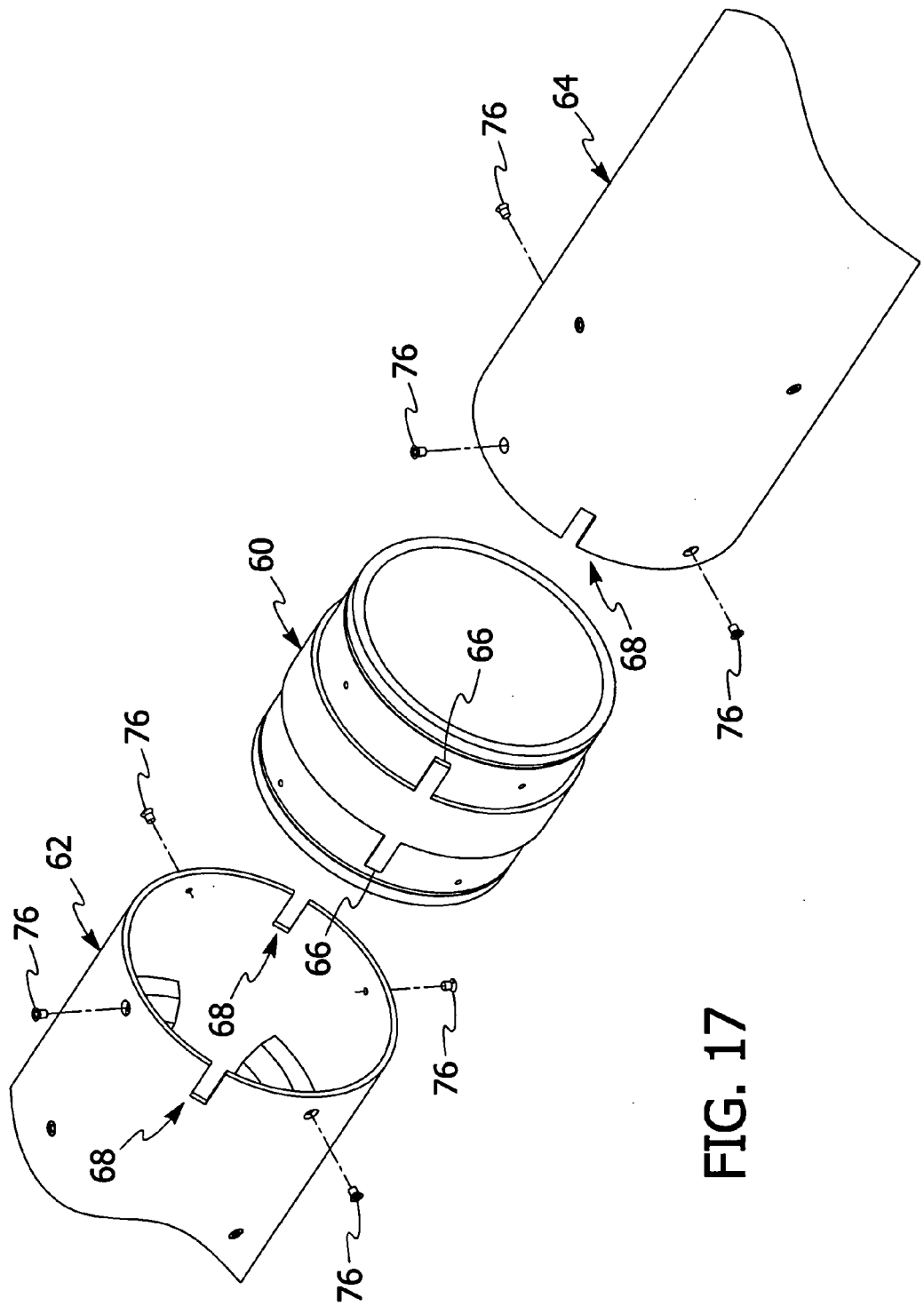
FIG. 17 is an enlarged and exploded fragmentary perspective view of a portion of the embodiment illustrated in FIG. 8.

Collection headers 56 and 58 are connected to conduit 52 to move along floor 2 of container B as conduit 52 moves between the fully extended and fully retracted positions. While two collection headers are shown only one or more than two collection headers may be connected to conduit 52. Each of the material collection headers 56 and 58 include one or more openings oriented directly adjacent floor 2 for receiving material collected in container B. Conduits 52 and 54 may be formed from a plurality of interconnected segments. On manner of connecting adjoining segments of conduits 52 and 54 is illustrated in FIGS. 16 and 17. A coupler 60 connects adjoining segments 62 and 64. Coupler 60 includes two sets of circumferentially spaced raised lugs 66 (only one set of lugs are shown) are received in two corresponding slots 68 formed in each segment 62 and 64. Coupler 60 may include a gasket 70 to ensure that the adjoining segments are fully sealed. Guides 74 may be used to maintain conduit 54 in a desired coaxial orientation with conduit 52. A plurality of rivets 76 or other fasteners may be used to connect coupler 60 to segments 62 and 64.

Figure 9:
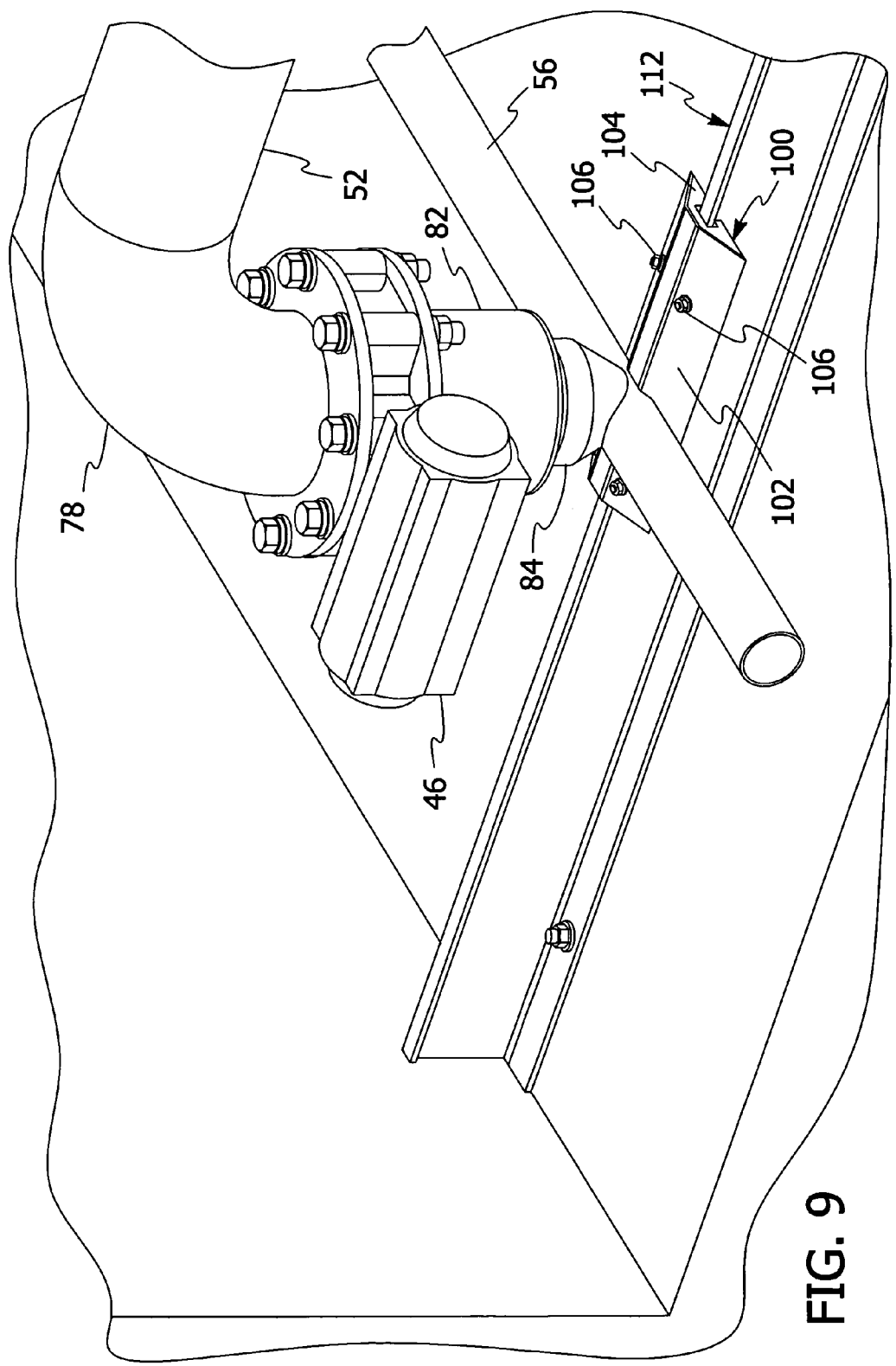
FIG. 9 is an enlarged fragmentary perspective view of a portion of the embodiment illustrated in FIG. 8.
Figure 10:
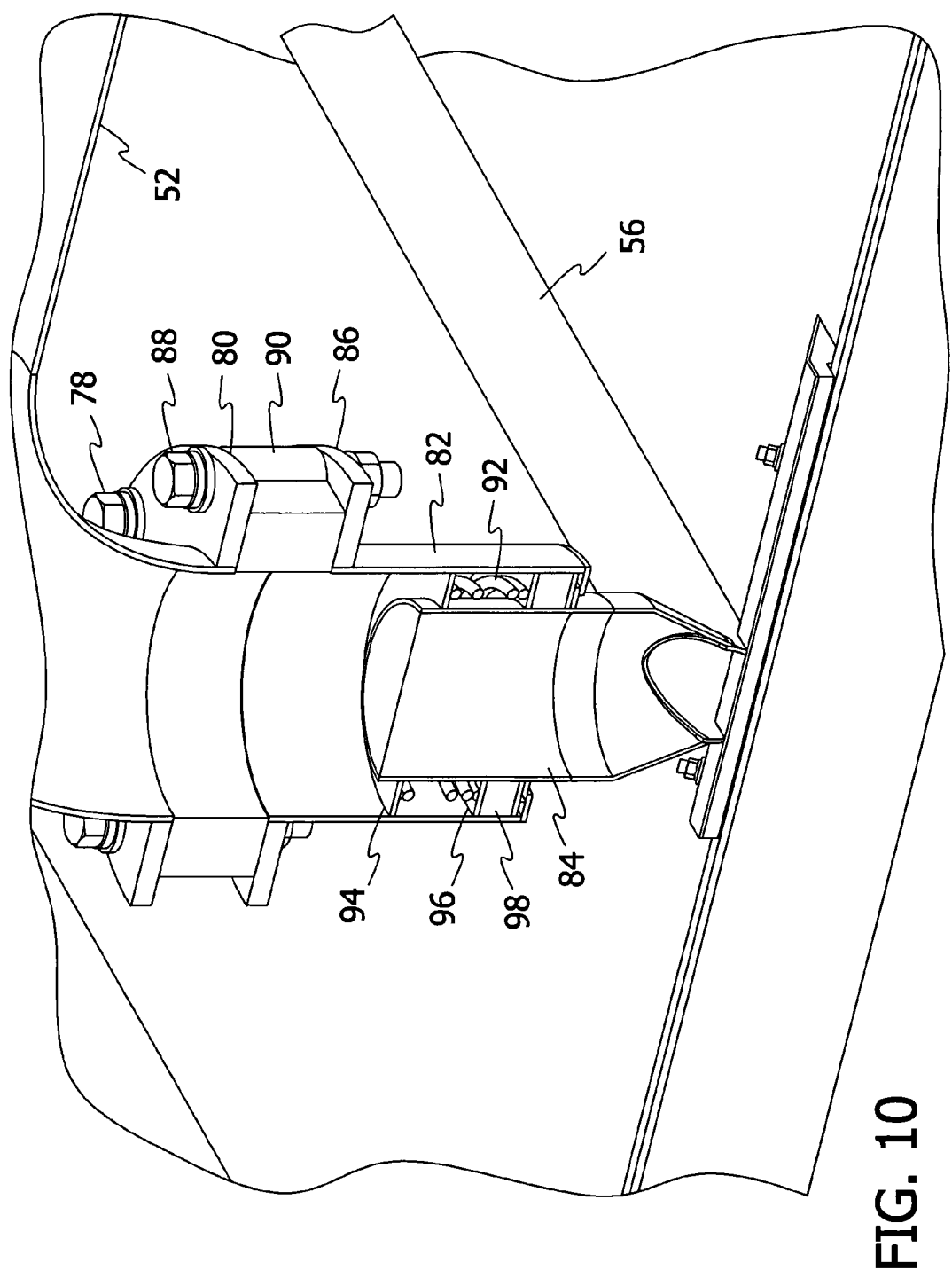
FIG. 10 is an enlarged fragmentary perspective view of a portion of the embodiment illustrated in FIG. 8.
Figure 19:
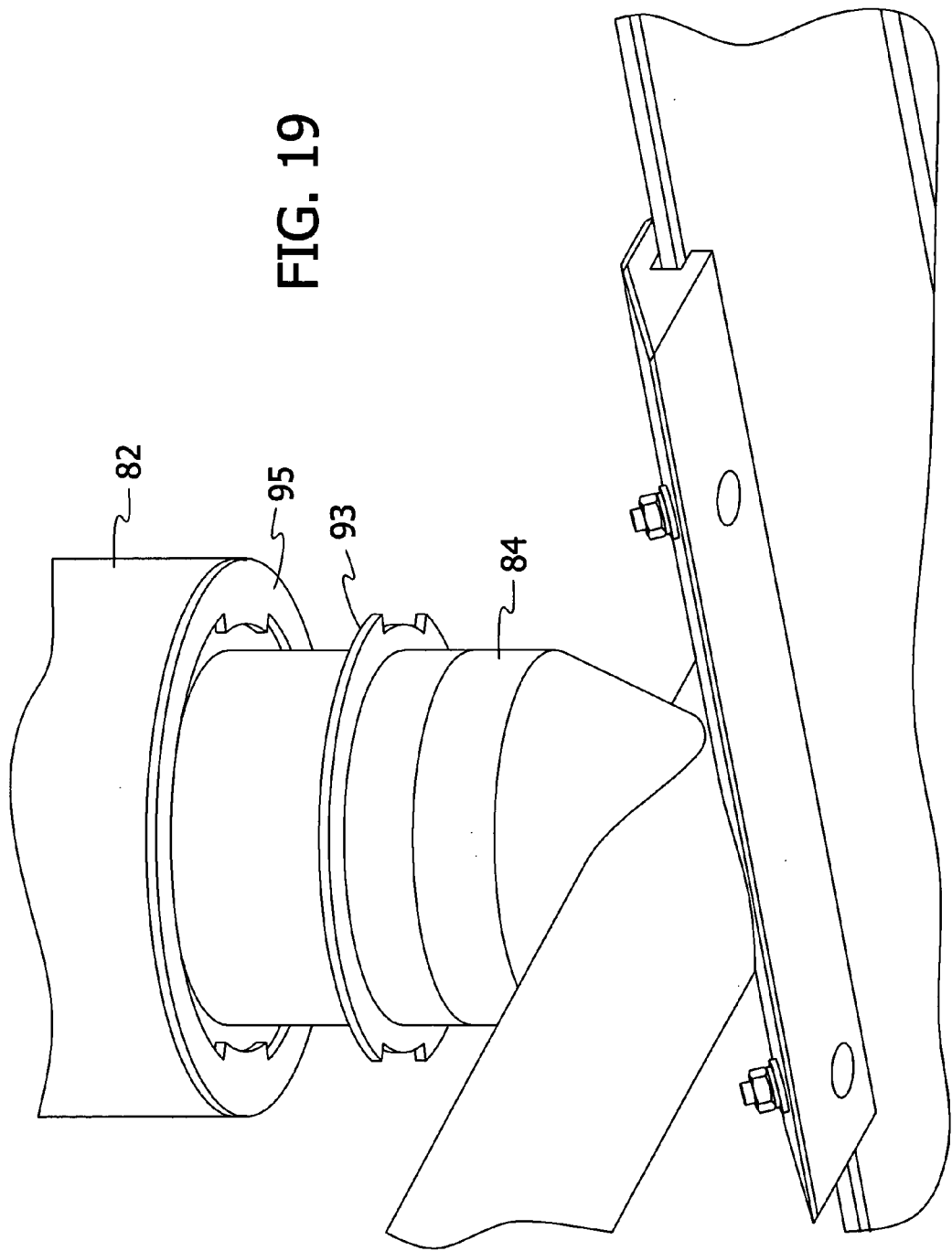
FIG. 19 is an enlarged fragmentary perspective view a further preferred form of a portion of material removal system.
Figure 21:
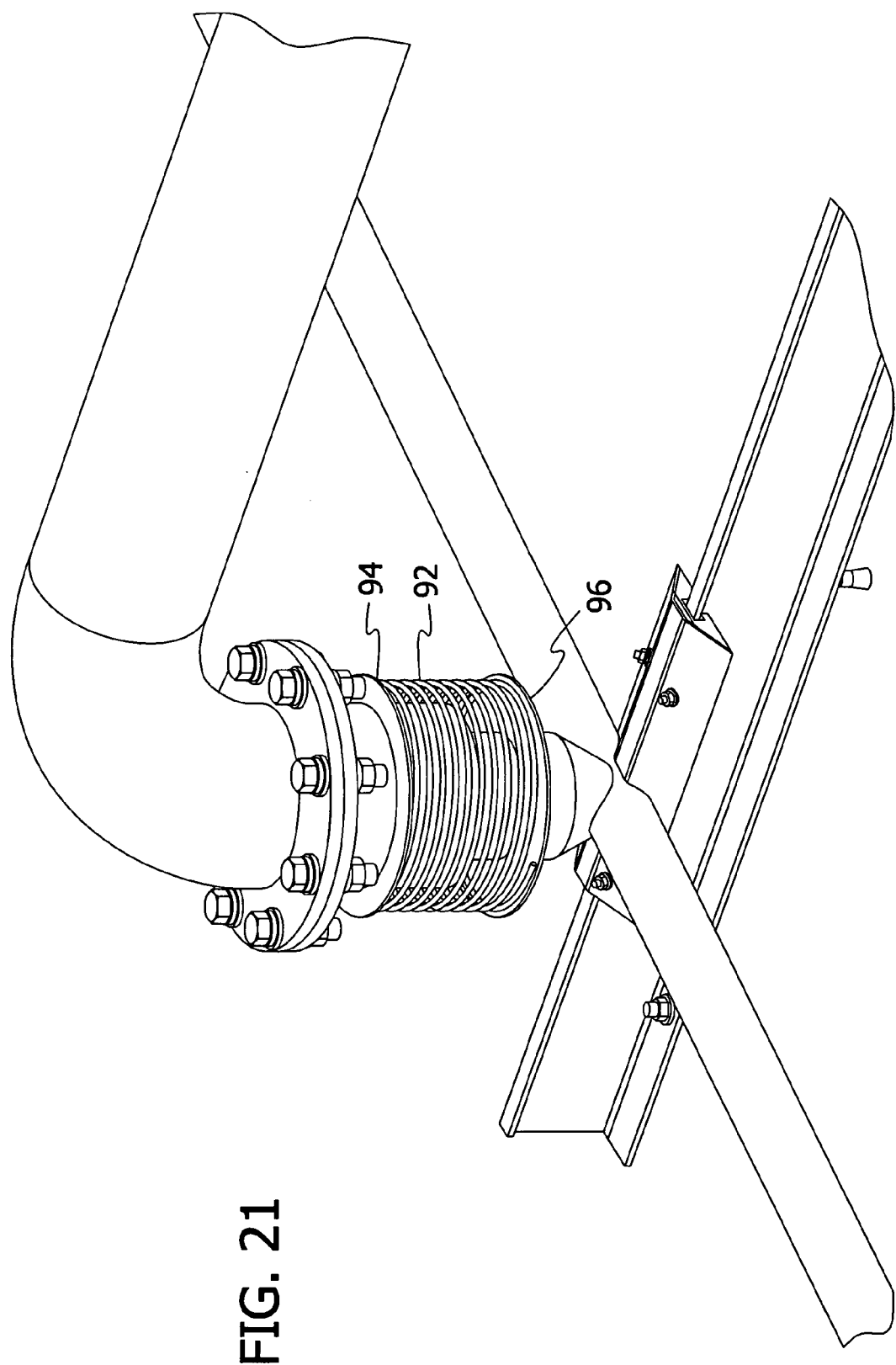
FIG. 21 is an enlarged fragmentary perspective view a further preferred form of a portion of material removal system.

Referring to FIG. 8, isolation valves 46 may be used to independently control the flow of material through collection headers 56 and 58 as more specifically described in the prior embodiments. Referring to FIGS. 9 and 10, the free end of conduit 52 includes an elbow or bent segment 78 having a coupling flange 80. Conduit 52 further includes an outer vertically extending segment 82 and an inner vertically extending segment 84. Segment 82 includes a coupling flange 86 that is fixed to coupling flange 80 via bolts 88. A seal 90 is fixed between flanges 80 and 86. The lower end of segment 84 is connected to header 56 so that material can flow from header 56 into segment 84 and down through conduit 52 to conduit 54 and ultimately out of container B. Segment 84 is adapted to move in a vertical direction relative to segment 82 so that the header 56 can be raised or lowered relative to floor 2 to compensate for irregularities in the container B (e.g., un-level floor). The relative movement between segments 82 and 84 may be controlled by a coil spring 92 mounted between flanges 94 and 96. Flange 94 may be connected to either segment 82 or 84 provided flange 96 is connected to the other segment. The spring may be replaced by any suitable damping member. A seal 98 formed from polymeric material may be used to seal the free end of conduit 52 and further regulate relative movement of segments 82 and 84. As shown in FIG. 21, the flanges 94 and 96 and coil spring 92 can be mounted externally. Referring to FIG. 19, segment 84 may be provided with a shaped flange 93 that is configured to pass upwardly into segment 82 through correspondingly shaped flange 95 when segments 82 and 84 are aligned as shown in FIG. 19. Segment 82 can be readily connected to segment 84 by merely twisting segment 84 ninety degrees from the position shown in FIG. 19.

Figure 14:
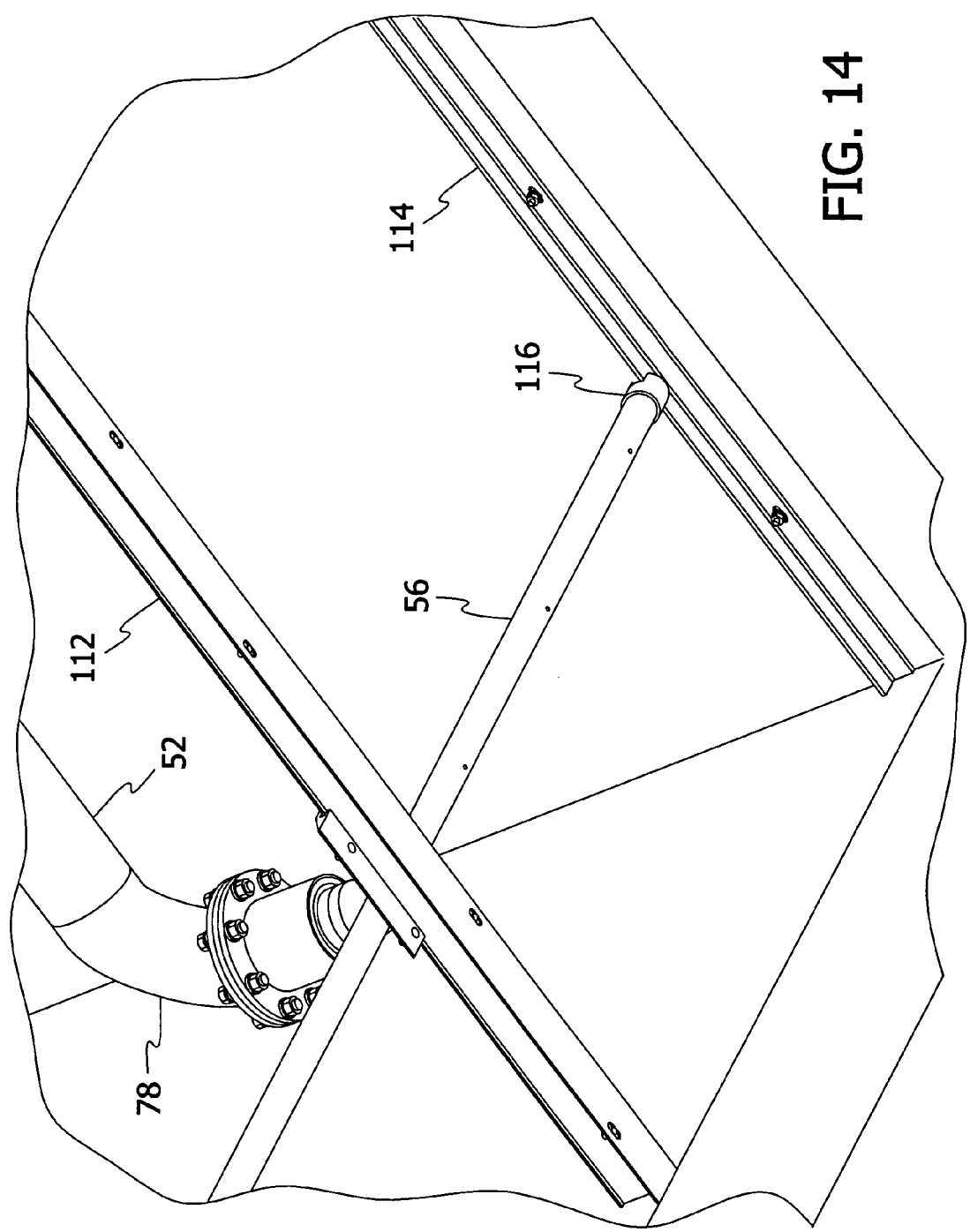
FIG. 14 is an enlarged fragmentary perspective view of a portion of the embodiment illustrated in FIG. 8 with the floor of the material collection container removed so that other components may be readily observed.
Figure 15:
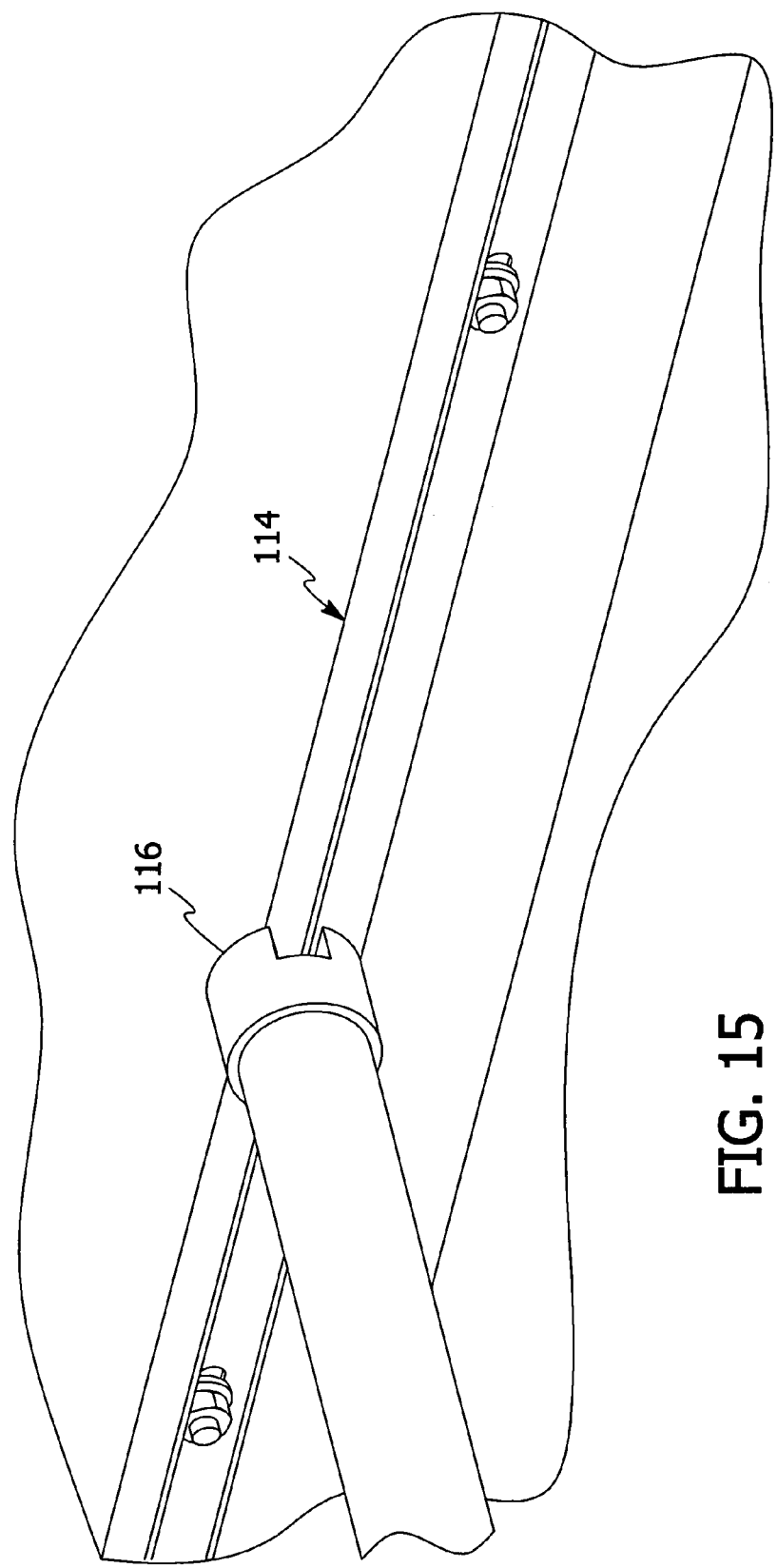
FIG. 15 is an enlarged fragmentary perspective view of a portion of the embodiment illustrated in FIG. 8.

Referring to FIGS. 9, 10 and 12 to 14, header 56 includes a notch or recess 28 having the attributes and advantages discussed in the prior embodiments. An insert 100 is disposed in and extends from each side of recess 28. The insert 100 includes a protective cover 102 mounted over a friction reducing member 104. Cover 102 may be connected to friction reducing member 104 by any suitable fastener including but not limited to screws 106. Friction reducing member 104 may be formed from a polymeric material or other suitable material. Member 104 includes a slot 108 for receiving horizontally extending member 110 of center rail 112. Center rail 112 is fixed to floor 2 by bolts or other suitable fasteners. It should be noted that center rail 112 may be embedded in floor 2 in a similar manner to that illustrated in FIG. 5. Alternatively, center rail 112 may be disposed in a recess in floor 2 as illustrated in FIG. 6. Referring to FIGS. 14 and 15, a side rail 114 may be provided adjacent each side wall of container B. Where side rails 114 are used, adjacent ends of headers 56 and 58 may be provided with a friction reducing member 116 to facilitate movement on side rail 114.

Figure 11:
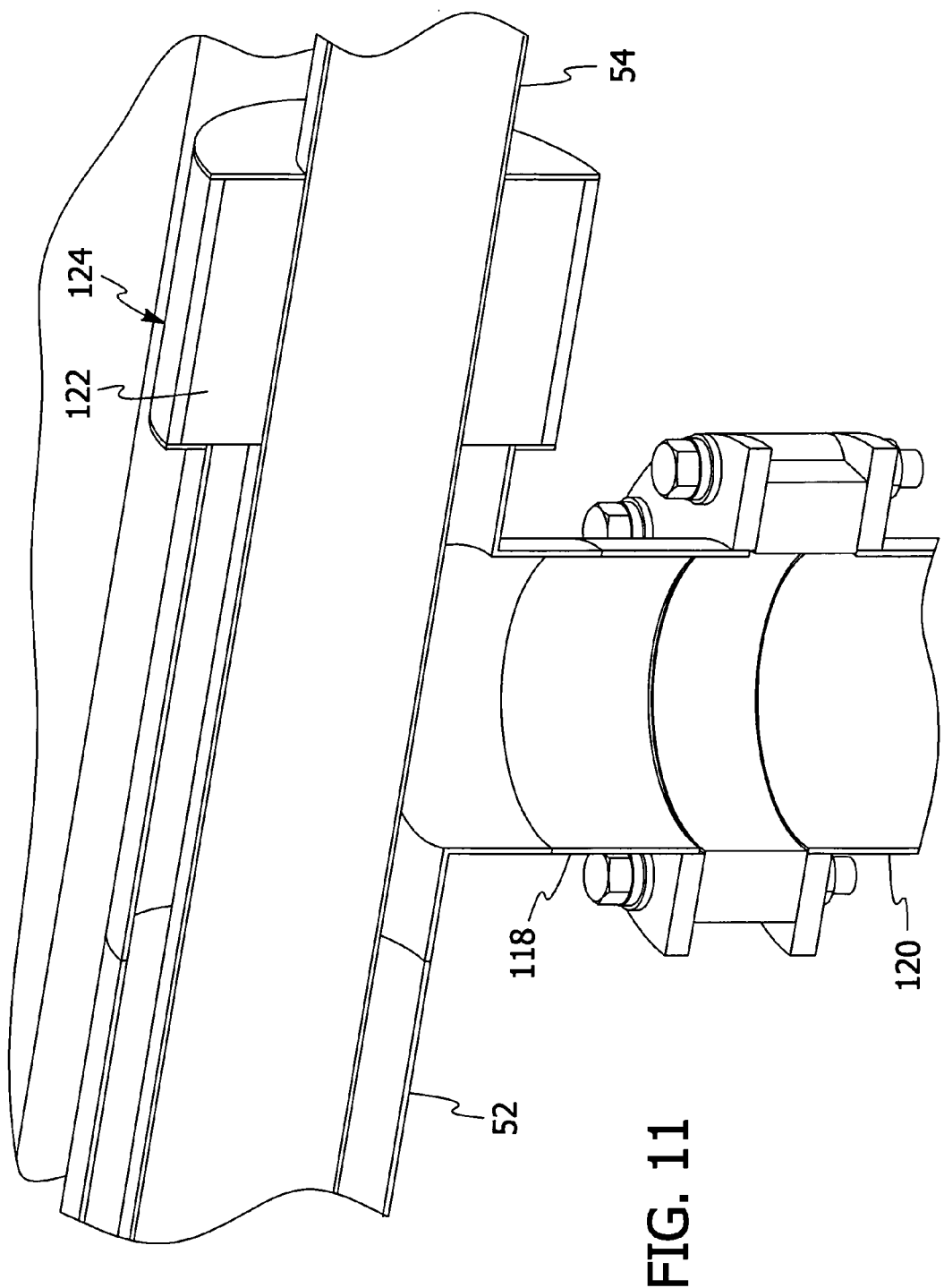
FIG. 11 is an enlarged fragmentary perspective view of a portion of the embodiment illustrated in FIG. 8.
Figure 12:
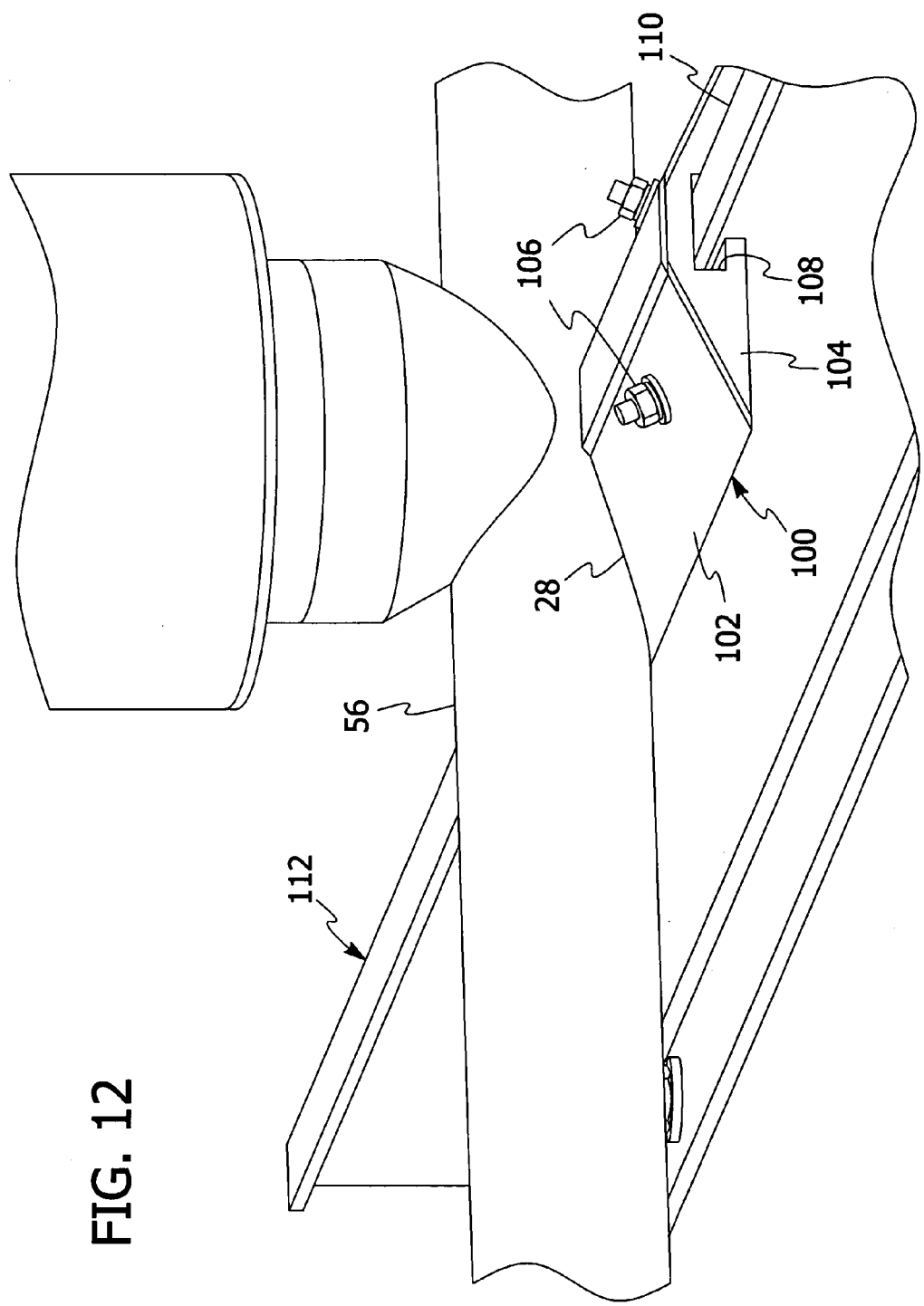
FIG. 12 is an enlarged fragmentary perspective view of a portion of the embodiment illustrated in FIG. 8.
Figure 13:
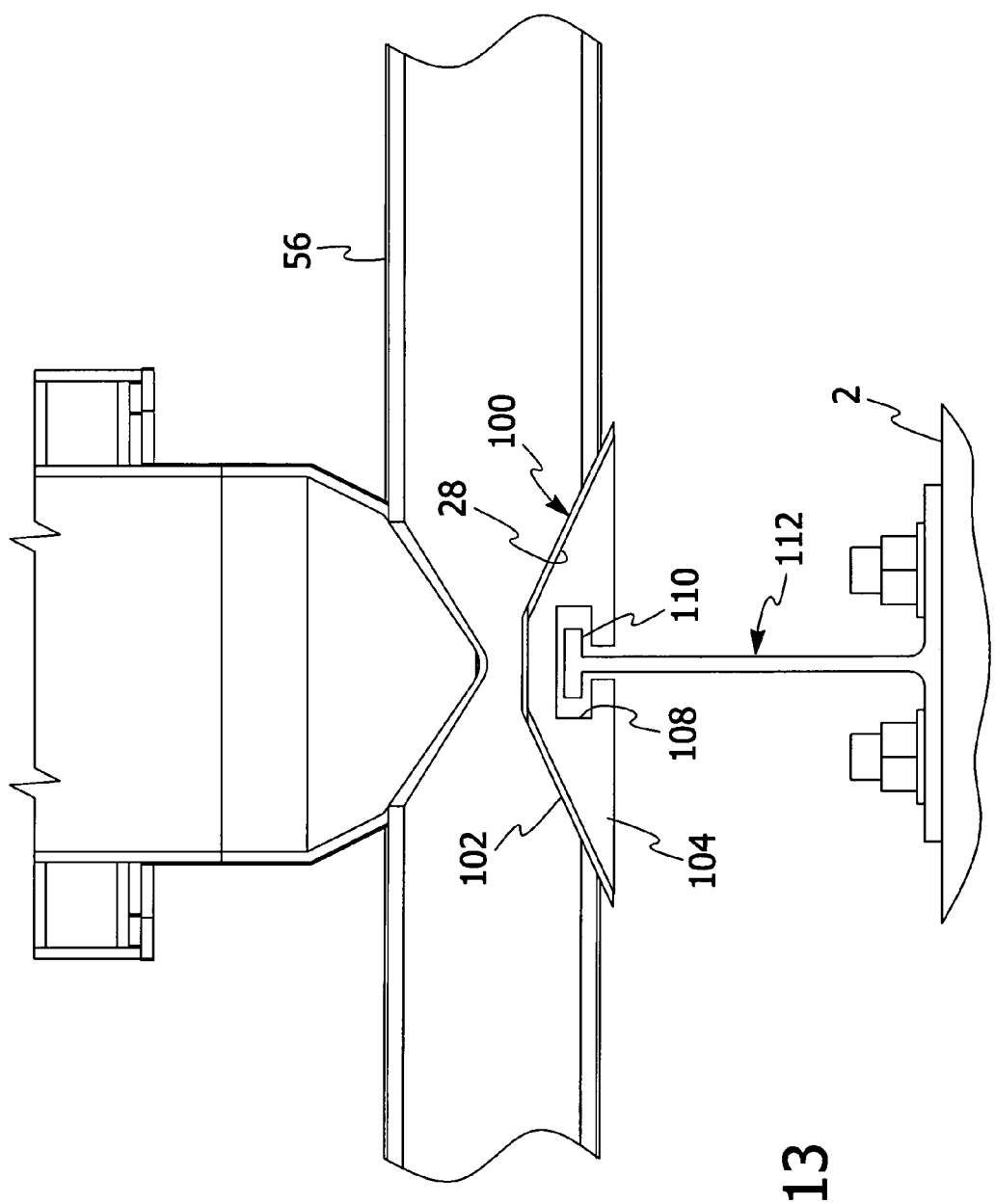
FIG. 13 is an enlarged cross-section view of a portion of the embodiment illustrated in FIG. 8.

Referring to FIG. 11, header 58 is connected to conduit 52 in a similar manner as header 56. Conduit 52 further includes two outer vertically extending segments 118 and 120 are connected in a similar manner as segments 78 and 82. An inner segment 121 (see FIG. 8) identical to segment 84 is movably connected to segment 120 in the same mane as segment 84 is movably connected to segment 82. The lower end of the inner segment 121 is connected to header 58. A seal 122 seals end 124 of conduit 52 about conduit 54.

Figure 18:
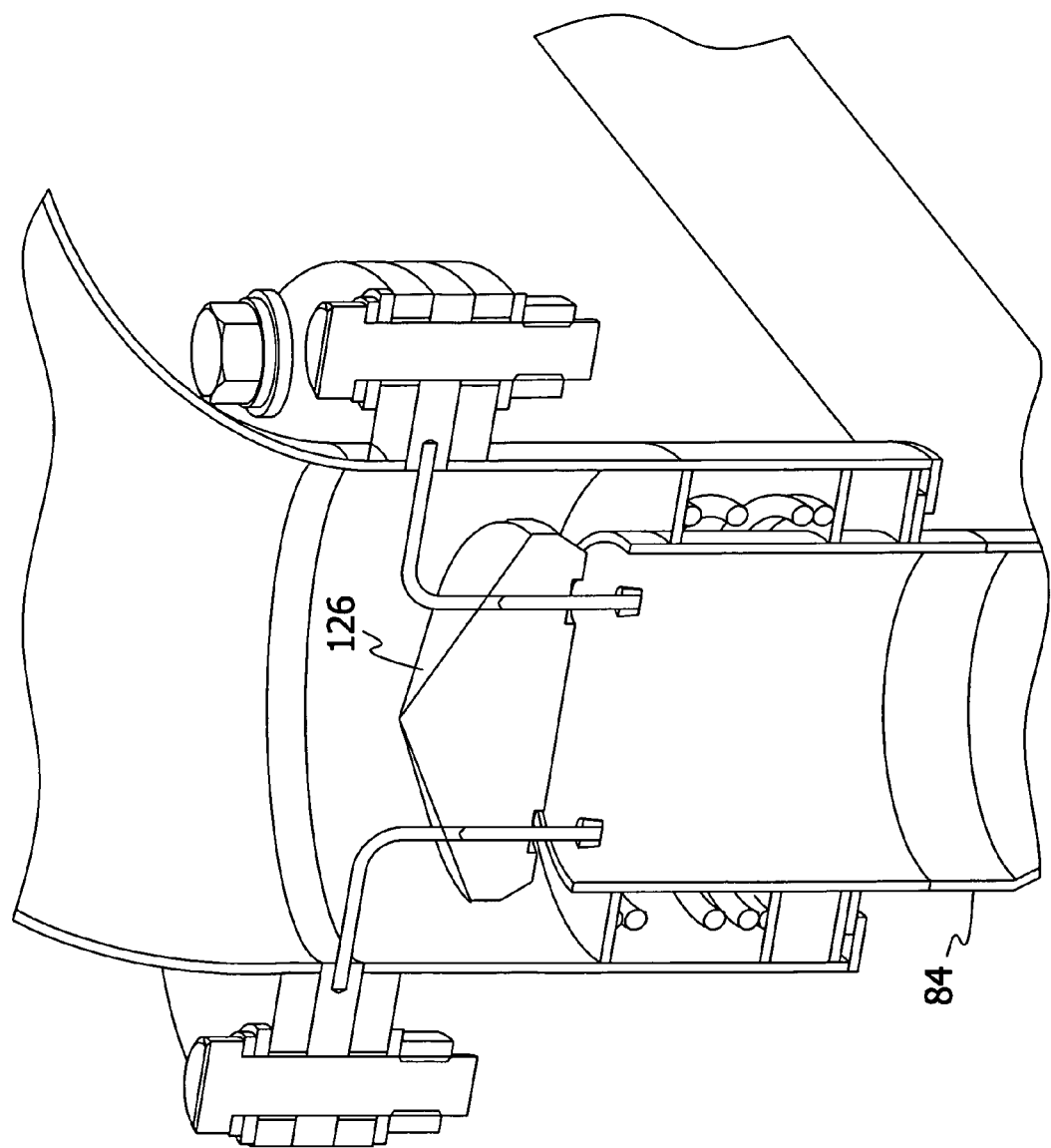
FIG. 18 is an enlarged fragmentary perspective view a further preferred form of a portion of material removal system.

Referring to FIG. 18, where a fluid drive system is used to move conduit 52 between end walls 4 and 6, a solid disk shaped flow preventer 126 is positioned above each of the inner movable segments 84 and 121 that are located adjacent headers 56 and 58. A fluid source may be connected to the external end of conduit 54 (i.e., the end outside of the container B) to supply a fluid (liquid or gas) to conduit 54. The fluid passes through conduit 54 into conduit 52 which in turn causes members 126 to seat in a fluid tight manner on the corresponding segments 84 and 121. As the fluid pressure builds up in conduits 52 and 54, conduit 52 is forced to move along conduit 54 toward end wall 6. In this manner conduit 52 can be moved forward (i.e., toward end wall 6) by any predetermined amount. It should be noted that the head of liquid stored in container B is preferably sufficient to unseat members 126 from corresponding segments 84 and 121 to permit sludge to pass from headers 56 and 58 into conduit 52. Therefore, once fluid is no longer being supplied to conduit 54 and conduit 52 member 126 resumes the position shown in FIG. 18. Material is removed from container B in this embodiment in a similar manner to that described in the prior embodiments, i.e., a vacuum pump or other means creates a negative pressure differential in conduits 52 and 54 causing material to pass through headers 56 and 58 and through conduits 52 and 54 to exit container B. Negative pressure differential can also be used to retract conduit 52.

Figure 20:
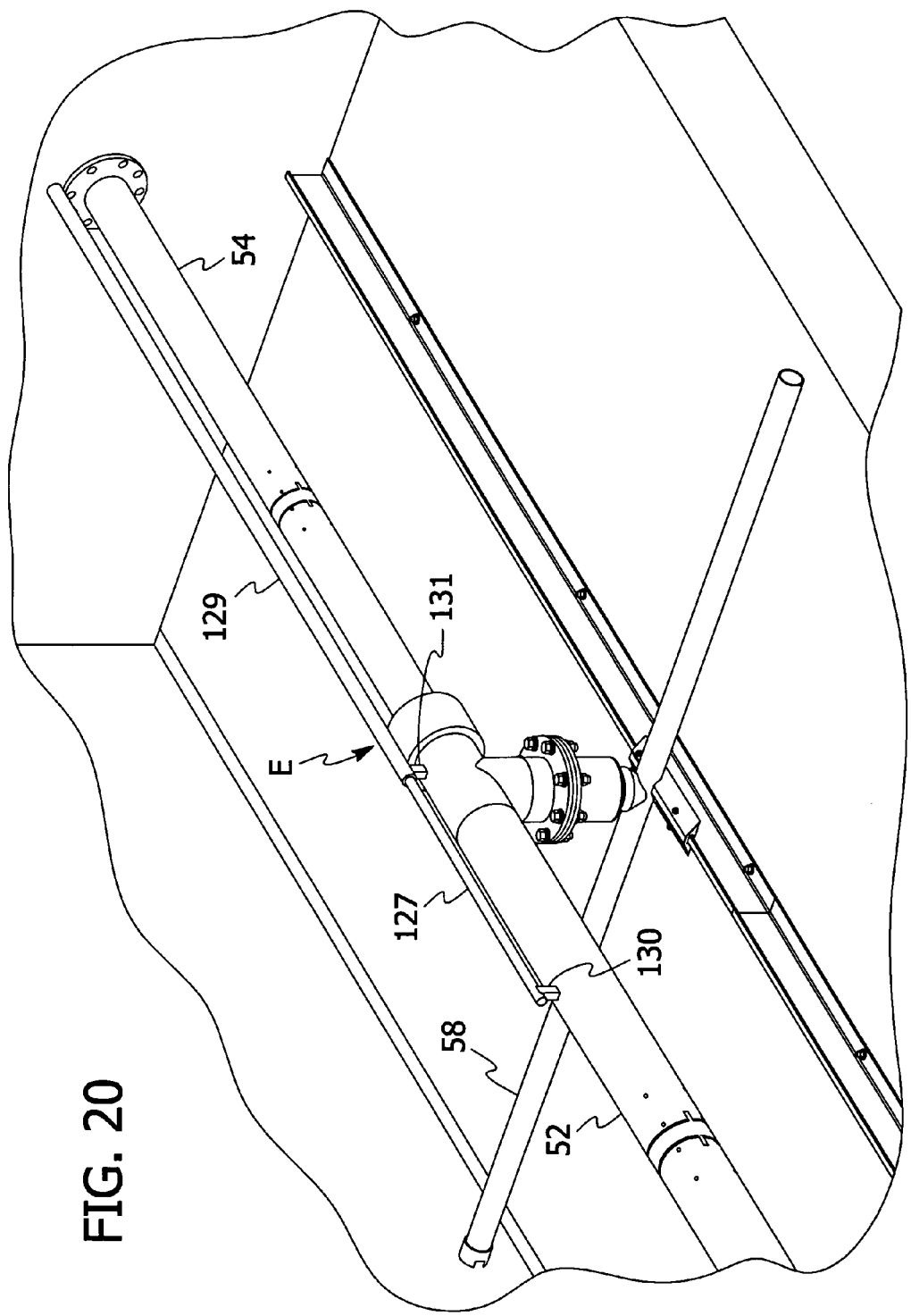
FIG. 20 is an enlarged fragmentary perspective view a further preferred form of a portion of material removal system.

Referring to FIG. 20, a fluid drive system E external to conduits 52 and 54 may be used to extend and retract conduit 52. Fluid drive system E includes two telescoping members 127 and 129 connected. Element 127 is configured to move between an extended and retracted position. Element 127 is connected to conduit 52 by arm 130. A fluid can be supplied to conduit 129 and in turn conduit 127 to cause conduit 127 to move toward a fully extended position which in turn cases conduit 52 to move toward an extended position. A negative pressure differential may be used to retract conduit 52. Guide 131 is fixed to conduit 52 but movable relative to conduits 127 and 129. Guide 131 acts to support conduit 129 while some portion of guide 129 is positioned above guide 131.

Figure 22:
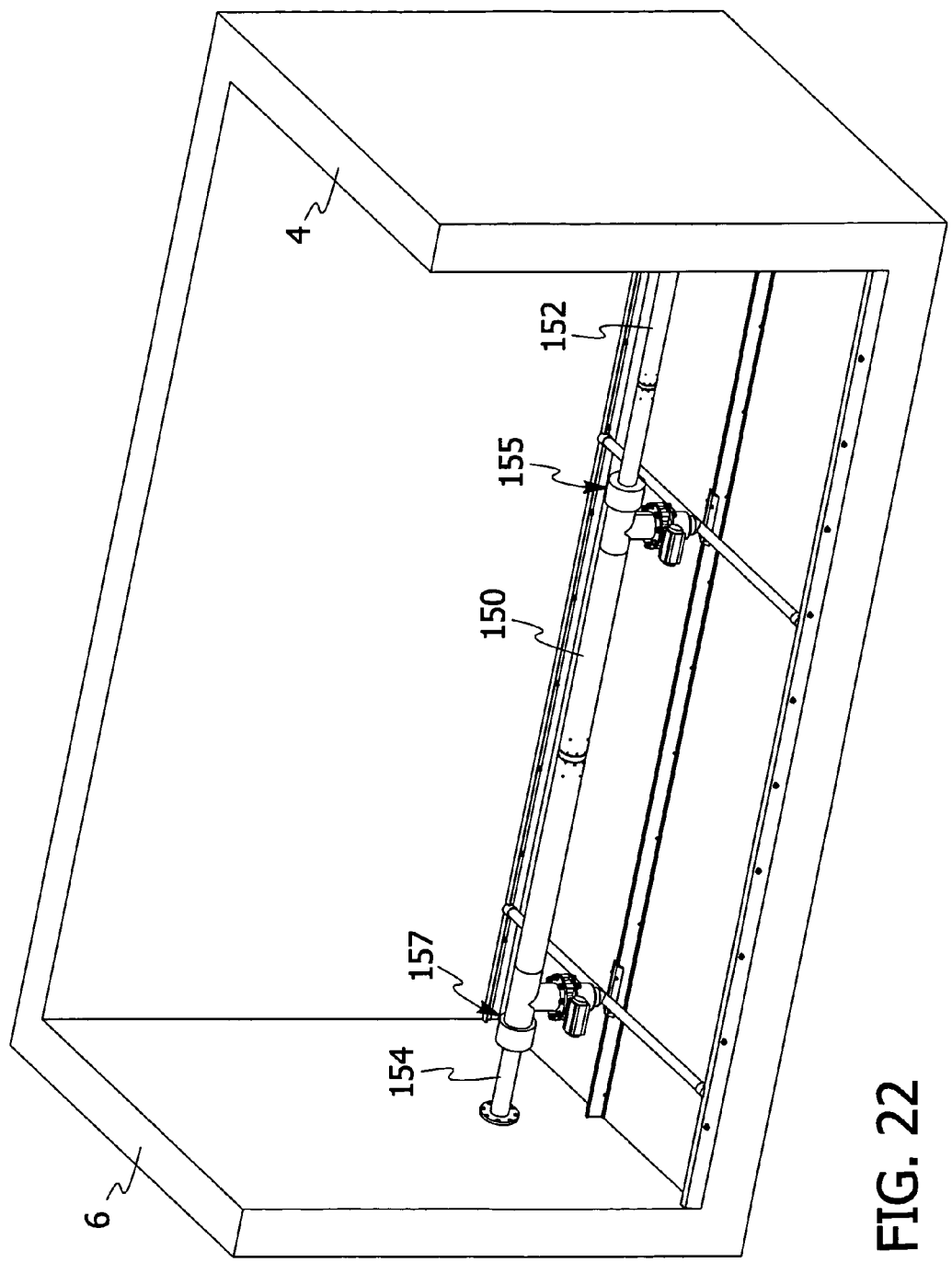
FIG. 22 is a fragmentary perspective view of a further preferred form of the present invention with one sidewall of the material collection container removed to permit other components to be readily observed.

Referring to FIG. 22, a further alternative embodiment is illustrated. In this embodiment outer conduit 150 is slidably mounted on two inner conduits 152 and 154 extending from end walls 4 and 6 respectively. The ends of conduits 152 and 154 located in conduit 150 are spaced from each other. A fluid may be supplied to conduit 152 to cause conduit 150 to move toward end wall 6. Similarly, a fluid may be supplied to conduit 154 to cause conduit 150 to move toward end wall 4. Each of ends 155 and 157 of conduit 150 may be formed like end 124 with a seal similar to seal 122.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An apparatus for removing material collected in a material collection container having a floor and at least one substantially vertically extending wall, said apparatus comprising:
   (a) a material removal assembly for removing material collected in the material collection container, said material removal assembly including a first conduit and a second conduit, said first conduit being in telescoping relationship with said second conduit to permit said first conduit to move relative to said second conduit; and,
   (b) said material removal assembly further including a first material removal header configured to receive material accumulating on the floor of the material collection container, said first material removal header being configured to direct material received by said first material removal header into said first conduit, said first material removal header being configured to move with said first conduit, said first material removal header including a hollow cavity extending along a longitudinal axis of said first material removal header, said hollow cavity having a lowermost portion and an uppermost portion, said first removal header includes a first inclined surface and a second inclined surface each being disposed in said hollow cavity and configured to facilitate movement of material from said first material header to said first conduit, said first inclined surface extending upwardly from said lowermost portion of said hollow cavity and said second inclined surface extending upwardly from said lowermost portion of said hollow cavity, said first inclined surface extending inwardly toward said second inclined surface and said second inclined surface extending inwardly toward said first inclined surface, said first inclined surface and said second inclined surface being spaced below said uppermost portion of said hollow cavity.

2. An apparatus as set forth in claim 1, wherein:
   (a) said first inclined surface is a planar surface.

3. An apparatus as set forth in claim 2, wherein:
   (a) said second inclined surface is a planar surface.

4. An apparatus as set forth in claim 3, wherein:
   (a) said first material removal header includes a connector having a first end and a second end, a first header segment and a second header segment, said first inclined surface is positioned between said first end and said second end of said connector.

5. An apparatus as set forth in claim 4, wherein:
   (a) said second inclined surface is positioned between said first end and said second end of said connector.

6. An apparatus as set forth in claim 5, wherein:
   (a) said connector is substantially T-shaped, said first header segment is connected to said first end of said connector and said second header segment is connected to said second end of said connector.

7. An apparatus as set forth in claim 1, wherein:
   (a) a substantially horizontally extending inner surface extending between an upper portion of said first inclined surface and an upper portion of said second inclined surface.

8. An apparatus as set forth in claim 1, wherein:
   (a) said material removal assembly further includes a fluid drive for moving said first conduit relative to said second conduit and means for positioning said first material removal header above the floor of the material collection container and in close proximity of the floor of the material collection container.

9. An apparatus for removing material collected in a material collection container having a floor and at least one substantially vertically extending wall, said apparatus comprising:
(a) a material removal assembly for removing material collected in the material collection container, said material removal assembly including a first conduit and a second conduit, said first conduit being in telescoping relationship with said second conduit to permit said first conduit to move relative to said second conduit; and,
(b) said material removal assembly further including a first material removal header configured to receive material accumulating on the floor of the material collection container, said first material removal header being configured to direct material received by said first material removal header into said first conduit, said first material removal header being configured to move with said first conduit, said first material removal header including means for facilitating movement of material received by said first material removal header into said first conduit, said means for facilitating movement of material includes a notch formed in a bottom surface of said first material removal header.

10. An apparatus as set forth in claim 9, wherein:
(a) said first material removal header includes first and second ends, said first end of said first material removal header is disposed adjacent a first sidewall of the material collection container, said second end of said first material removal header is disposed adjacent a second sidewall of the material collection container, said notch is disposed between said first end of said first material removal header and said second end of said first material removal header, said notch is disposed below a lowermost portion of said first conduit.

11. An apparatus as set forth in claim 10, further including:
(a) a support assembly for supporting said material removal assembly, said support assembly is operably associated with said notch.

12. An apparatus as set forth in claim 11, wherein:
(a) said support assembly includes a friction reducing member extending into said notch and a support member fixed relative to the floor of the material collection container, said friction reducing member being connected to said support member and configured to permit said first material removal header to move along said support member upon movement of said first conduit, said support member extending substantially parallel to said first conduit.

13. An apparatus as set forth in claim 12, wherein:
(a) said friction reducing member is formed from a polymeric material.

14. An apparatus as set forth in claim 12, wherein:
(a) said support member is anchored to the floor of the material collection container.

15. An apparatus for removing material collected in a material collection container having a floor and first and second end walls, said apparatus comprising:
(a) a material removal assembly for removing material collected in the material collection container, said material removal assembly including a first conduit and a second conduit, said first conduit being in telescoping relationship with said second conduit to permit said first conduit to move relative to said second conduit;
(b) said material removal assembly further including a first material removal header configured to receive material accumulating on the floor of the material collection container, said first material removal header being configured to direct material received by said first material removal header into said first conduit, said first material removal header being configured to move with said first conduit; and,
(c) said material removal assembly further including a support member configured to extend between the first and second end walls of the material collection container, said support member having a first end and a second end, said first material removal header being configured to ride along said support member when said first material removal header travels between the first and second end walls of the material collection container, said support member being spaced from said first conduit and said second conduit, said first material removal header having a recessed portion, said support member extends into said recessed ortion of said first material removal header.

16. An apparatus as set forth in claim 15, further including:
(a) an insert being disposed in said recessed portion of said first material removal header, said insert being configured to facilitate movement of said first material removal header along said support member.

17. An apparatus for removing material collected in a material collection container having a floor and at least one substantially vertically extending wall, said apparatus comprising:
(a) a material removal assembly for removing material collected in the material collection container, said material removal assembly including a first conduit and a second conduit, said first conduit being in telescoping relationship with said second conduit to permit said first conduit to move relative to said second conduit; and,
(b) said material removal assembly further including a first material removal header having a hollow cavity configured to receive material accumulating on the floor of the material collection container, said first material removal header being configured to direct material received in said first material removal header into said first conduit, said first material removal header being configured to move with said first conduit, said first material removal header including means for facilitating movement of material received by said first material removal header into said first conduit, said means for facilitating movement of material received by said first material removal header into said first conduit being disposed entirely within said first material removal header.

18. An apparatus as set forth in claim 17, wherein:
(a) said means for facilitating movement received by said first material removal header into said first conduit includes at least a first upwardly extending inner surface configured to direct material received by said first material removal header into said first conduit.

19. An apparatus as set forth in claim 18, wherein:
(a) said means for facilitating movement received by said first material removal header into said first conduit includes at least a second upwardly extending inner surface configured to direct material received by said first material removal header into said first conduit.

20. An apparatus as set forth in claim 19, wherein:
(a) said first upwardly extending inner surface is spaced from said second upwardly extending inner surface.

21. An apparatus as set forth in claim 19, wherein:
(a) said first upwardly extending inner surface forms a portion of an inner wall defining said hollow cavity.

22. An apparatus as set forth in claim 21, wherein:
(a) said second upwardly extending inner surface forms a portion of an inner wall defining said hollow cavity.

23. An apparatus for removing material collected in a material collection container having a floor and at least one substantially vertically extending wall, said apparatus comprising:
(a) a material removal assembly for removing material collected in the material collection container, said material removal assembly including a first conduit and a second conduit, said first conduit being in telescoping relationship with said second conduit to permit said first conduit to move relative to said second conduit; and,
(b) said material removal assembly further including a first material removal header configured to receive material accumulating on the floor of the material collection container, said first material removal header being configured to direct material received in said first removal header into said first conduit, said first material removal header being configured to move with said first conduit, said first material removal header having a first portion being disposed on a first side of said first conduit and a second portion disposed on a side of said first conduit opposite of said first side, said first material removal header having a first internal surface for facilitating movement of material from said first portion to said first conduit and a second internal surface for facilitating movement of material from said second portion to said first conduit, said first internal surface being inclined inwardly toward said second internal surface and said second internal surface being inclined inwardly toward said first internal surface.

24. An apparatus as set forth in claim 23, wherein:
(a) said first internal surface forms a portion of an inner wall of said first material removal header.

25. An apparatus as set forth in claim 24, wherein:
(a) said second internal surface forms a portion of an inner wall of said first material removal header.

26. An apparatus as set forth in claim 23, wherein:
(a) said first internal surface is a planar surface.

27. An apparatus as set forth in claim 26, wherein:
(a) said second internal surface is a planar surface.

28. An apparatus for removing material collected in a material collection container having a floor and at least one substantially vertically extending wall, said apparatus comprising:
(a) a material removal assembly for removing material collected in the material collection container, said material removal assembly including a first conduit and a second conduit, said first conduit being in telescoping relationship with said second conduit to permit said first conduit to move relative to said second conduit; and,
(b) said material removal assembly further including a first material removal header configured to receive material accumulating on the floor of the material collection container, said first material removal header being configured to direct material received in said first material removal header into said first conduit, said first material removal header being configured to move with said first conduit, said first material removal header having a T-shaped coupling member having a first end and a second end, a first header section and a second header section, said first header section being connected to said first end in a fluid tight manner and said second header section being connected to said second end in a fluid tight manner, said means for facilitating movement being disposed entirely within said T-shaped coupling member.

29. An apparatus as set forth in claim 28, wherein:
(a) said means for facilitating movement includes a first inclined surface and a second inclined surface, said first inclined surface is spaced from said second inclined surface.

30. An apparatus as set forth in claim 29, wherein:
(a) a substantially horizontally extending inner surface extends between said first inclined surface and said second inclined surface.

31. An apparatus as set forth in claim 29, wherein:
(a) said first inclined surface is a planar surface.

32. An apparatus as set forth in claim 31, wherein:
(a) said second inclined surface is a planar surface.

* * * * *

UNITED STATES PATENT AND TRADEMARK OFFICE
CERTIFICATE OF CORRECTION

PATENT NO. : 9,067,727 B2  Page 1 of 1
APPLICATION NO. : 13/373303
DATED : June 30, 2015
INVENTOR(S) : Roberts et al.

It is certified that error appears in the above-identified patent and that said Letters Patent is hereby corrected as shown below:

In the Specification
Column 3, line 12, "mover" now reads -- move --.
Column 3, lines 12 and 13, "accom-modates" now reads -- accom-modate --.
Column 3, line 30, "wall The" now reads -- wall. The --.
Column 4, line 10, "conduct" now reads -- conduit --.
Column 4, line 12, "conduct" now reads -- conduit --.
Column 9, line 57, "used move" now reads -- used to move --.
Column 9, line 67, "On" now reads -- One --.
Column 10, line 5, "are received" now reads -- which are received --.
Column 11, line 2, "mane" now reads -- manner --.
Column 11, line 37, "127 and 129 connected." now reads -- 127 and 129. --.
In the Claims
Claim 15, column 14, line 16, "ortion" now reads -- portion --.
Claim 28, column 16, line 24, "said means for facilitating movement" now reads -- a means for facilitating movement --.

Signed and Sealed this
Twenty-sixth Day of April, 2016

Michelle K. Lee
*Director of the United States Patent and Trademark Office*